(12) United States Patent
Konieczny et al.

(10) Patent No.: US 10,616,584 B2
(45) Date of Patent: Apr. 7, 2020

(54) METHOD AND APPARATUS FOR ENCODING AND DECODING A TEXTURE BLOCK USING DEPTH BASED BLOCK PARTITIONING

(71) Applicant: Huawei Technologies Co., Ltd., Shenzhen (CN)

(72) Inventors: Jacek Konieczny, Munich (DE); Fabian Jaeger, Aachen (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 599 days.

(21) Appl. No.: 15/000,539

(22) Filed: Jan. 19, 2016

(65) Prior Publication Data
US 2016/0134874 A1  May 12, 2016

Related U.S. Application Data

(63) Continuation of application No. PCT/EP2013/065360, filed on Jul. 19, 2013.

(51) Int. Cl.
*H04N 11/02* (2006.01)
*H04N 19/136* (2014.01)
(Continued)

(52) U.S. Cl.
CPC ......... *H04N 19/136* (2014.11); *H04N 13/161* (2018.05); *H04N 19/119* (2014.11);
(Continued)

(58) Field of Classification Search
CPC .. H04N 19/136; H04N 19/119; H04N 19/176; H04N 19/192; H04N 19/44;
(Continued)

(56) References Cited

U.S. PATENT DOCUMENTS 6,071,193 A * 6/2000 Suzuoki ................ H04N 19/46
345/592
6,381,364 B1 * 4/2002 Gardos .................... G06T 9/40
382/173
(Continued)

FOREIGN PATENT DOCUMENTS

CN 102055982 A 5/2011
JP 2015518338 A 6/2015
(Continued)

OTHER PUBLICATIONS

Foreign Communication From a Counterpart Application, Korean Application No. 10-2017-7018453, Korean Office Action dated Mar. 7, 2018, 3 pages.
(Continued)

*Primary Examiner* — Jayanti K Patel
*Assistant Examiner* — Richard B Carter
(74) *Attorney, Agent, or Firm* — Conley Rose, P.C.

(57) ABSTRACT

A method and apparatus for encoding and decoding a texture block using depth based block partitioning, which includes an apparatus for decoding an encoded texture block of a texture image, and a partitioner, determines a partitioning mask for the encoded texture block based on depth information associated to the encoded texture block, and the partitioning mask defines a plurality of partitions and to associate a texture block element of the encoded texture block to a partition of the plurality of partitions of the encoded texture block, and a decoder decode the partitions of the plurality of partitions of the encoded texture block based on the partitioning mask.

20 Claims, 11 Drawing Sheets

(51) Int. Cl.
  *H04N 13/161* (2018.01)
  *H04N 19/597* (2014.01)
  *H04N 19/119* (2014.01)
  *H04N 19/192* (2014.01)
  *H04N 19/176* (2014.01)
  *H04N 19/44* (2014.01)
  *H04N 19/52* (2014.01)
  *H04N 19/61* (2014.01)
  *H04N 19/90* (2014.01)

(52) U.S. Cl.
  CPC ......... *H04N 19/176* (2014.11); *H04N 19/192* (2014.11); *H04N 19/44* (2014.11); *H04N 19/52* (2014.11); *H04N 19/597* (2014.11); *H04N 19/61* (2014.11); *H04N 19/90* (2014.11)

(58) Field of Classification Search
  CPC ...... H04N 19/52; H04N 19/597; H04N 19/61; H04N 19/90; H04N 13/161
  USPC ............... 375/240.08, 240.12; 345/158, 592; 382/173, 199; 348/43
  See application file for complete search history.

(56) References Cited

U.S. PATENT DOCUMENTS

| | | | | |
|---|---|---|---|---|
| 2010/0295783 | A1* | 11/2010 | El Dokor ................ | G06F 3/017 345/158 |
| 2013/0128965 | A1* | 5/2013 | Zhang .................... | H04N 19/00 375/240.12 |
| 2014/0168362 | A1* | 6/2014 | Hannuksela ......... | H04N 13/161 348/43 |
| 2014/0301649 | A1* | 10/2014 | Zhang .................. | G06T 7/0002 382/199 |
| 2016/0134874 | A1 | 5/2016 | Konieczny et al. | |

FOREIGN PATENT DOCUMENTS

| KR | 101756301 B1 | 7/2017 |
|---|---|---|
| WO | 2009094036 A1 | 7/2009 |
| WO | 2012171477 A1 | 12/2012 |
| WO | 2013160559 A1 | 10/2013 |

OTHER PUBLICATIONS

Foreign Communication From a Counterpart Application, Korean Application No. 10-2017-7018453, English Translation of Korean Office Action dated Mar. 7, 2018, 1 pages.
Machine Translation and Abstract of Chinese Publication No. CN102055982, May 11, 2011, 24 pages.
Foreign Communication From a Counterpart Application, Chinese Application No. 201380078359.4, Chinese Office Action dated Dec. 4, 2017, 10 pages.
Foreign Communication From a Counterpart Application, Chinese Application No. 201380078359.4, Chinese Office Action dated Nov. 24, 2017, 2 pages.
Merkle, P., et al., "3D Video: Depth Coding Based on Inter-component Prediction of Block Partitions," Picture Coding Symposium, May 7-9, 2012, pp. 149-152.
Shimizu, S., et al., "Depth-Based Weighted Bi-Prediction for Video Plus Depth Map Coding," ICIP, 2012, pp. 1313-1316.
Lee, C., et al., "A Framework of 3D Video Coding using View Synthesis Prediction," Picture Coding Symposium, May 7-9, 2012, pp. 9-12.
Jung, J., et al., "3D-CE3.h: Depth Quadtree Prediction for 3DHTM 4.1," Joint Collaborative Team on 3D Video Coding Extension Development of ITU-T SG 16 WP3 and ISO/IEC JTC 1/SC 29/WG 11, JCT3V-B0068, Oct. 13-19, 2012, 10 pages.
Tech, G., "3D-HEVC Test Model 2," Joint Collaborative Team on 3D Video Coding Extension Development of ITU-T SG 16 WP3 and ISO/IEC JTC 1/SC 29/WG 11, JCT3V-B1005_d0, Oct. 13-19, 2012, 118 pages.
Hannuksela, M., et al., "3D-AVC Draft Text 6," Joint Collaborative Team on 3D Video Coding Extension Development of ITU-T SG 16 WP3 and ISO/IEC JTC 1/SC 29/WG 11, JCT3V-D1002, Jan. 17-23, 2013, 83 pages.
Nokia Corp, "Description of Nokia's response to MPEG 3DV Call for Proposals on 3DV Video Coding Technologies," ISO/IEC JTC1/SC29/WG11 MPEG2011/M22552, Nov. 2011, 21 pages.
Fraunhofer Institute, "Description of 3D Video Technology Proposal by Fraunhofer HHI (HEVC compatible; configuration A)," ISO/IEC JTC1/SC29/WG11 MPEG 2011/M22570, Nov. 2011, 48 pages.
Domanski, M., et al., "Technical Description of Poznan University of Technology proposal for Call on 3D Video Coding Technology," ISO/IEC JTC1/SC29/WG11 MPEG2011/M22697, Nov. 2011, 29 pages.
Winken, M., et al., "Motion Vector Inheritance for High Efficiency 3D Video plus Depth Coding," Picture Coding Symposium, May 7-9, 2012, pp. 53-56.
Foreign Communication From a Counterpart Application, PCT Application No. PCT/EP2013/065360, International Search Report dated Jan. 23, 2014, 4 pages.
Foreign Communication From a Counterpart Application, PCT Application No. PCT/EP2013/065360, Written Opinion dated Jan. 23, 2014, 7 pages.
Jager, F., et al., "CE3: Results on Depth-based Block Partitioning (DBBP)" JCT3V-G0106, Jan. 11-17, 2013, 6 pages.
Tech, G., et al., "3D-HEVC Test Model 4" JCT3V-D1005-v4, Apr. 20-26, 2013, 10 pages.
Foreign Communication From a Counterpart Application, Japanese Application No. 2016-526459, Japanese Office Action dated May 16, 2017, 7 pages.
Foreign Communication From a Counterpart Application, Japanese Application No. 2016-526459, English Translation pf Japanese Office Action dated May 16, 2017, 7 pages.

* cited by examiner

Algorithm 1 Decoding Process for Partitioning Mode in Dependent Texture Views

Precondition: Prediction mode of CU is not INTRA.

function DECODEPARTMODE(CU)
   part_mode    read(*bitstream*)   ← 910
   dbbp_flag    false   ← 920
   if part_mode == SIZE_Nx2N then
      dbbp_flag    read(*bitstream*)   } 930
   if dbbp_flag == true then
      part_mode    derivePartModeFromDepth(CU)   } 940
   return part_mode

Fig. 9

METHOD AND APPARATUS FOR ENCODING AND DECODING A TEXTURE BLOCK USING DEPTH BASED BLOCK PARTITIONING

CROSS-REFERENCE TO RELATED APPLICATIONS

This application is a continuation of International Application No. PCT/EP2013/065360, filed on Jul. 19, 2013, which is hereby incorporated by reference in its entirety.

TECHNICAL FIELD

Embodiments of the present disclosure relate to the field of computer vision, and in particular to texture-plus-depth image and video coding as used, for example, in three-dimensional (3D) image and video coding.

BACKGROUND

In 3D video processing depth data is usually represented as a set of depth maps that correspond to each frame of the texture video. The intensity of each point of the depth map describes the distance from the camera of the visual scene represented by this point. Alternatively, a disparity map may be used, wherein the disparity values are inversely proportional to the depth values of the depth map.

In 3D video coding, a depth map for each view needs to be encoded besides the conventional video data, which is also referred to as texture data or texture information. To preserve backward compatibility for non-3D codecs, in existing 3D video codecs the texture data for the base-view is encoded first. The order of coding remaining components can be adjusted. Currently, there are two main coding orders utilized: texture-first and depth-first, which both provide opportunity to exploit the inter-component dependencies, i.e. the dependency between the texture component and the corresponding depth component or disparity component, to increase the overall coding performance of the 3D video codecs. Texture-first coding order enables advanced texture dependent coding tools to be used for coding the depth data. On the other hand, depth-first coding order enables advanced depth dependent coding tools for texture coding.

In a future standard for 3D video coding, called 3D extension of high efficiency video coding (3D-HEVC), G. Tech, K. Wegner, Y. Chen, S. Yea, "3D-HEVC test model 2", document of Joint Collaborative Team on 3D Video Coding Extension Development (JCT3V), JCT3V-B1005, October, 2012, currently the texture-first coding order is used in the common test conditions (CTC). In a further future standard for 3D video coding, called 3D advanced video coding (3D-AVC), "3D-AVC Draft Text 6", JCT3V-D1002, Incheon, Republic of Korea, April 2013, currently the depth-first coding order is used in the CTC.

The combined coding of 3D videos is an important research field with the goal to exploit inter-component dependencies to increase the overall coding performance. Both directions (texture-to-depth and depth-to-texture) are possible and may result in improving the overall coding efficiency utilizing inter-component dependencies.

In P. Merkle, C. Bartnik, K. Muller, D. Marpe, T. Wiegand, *"Depth Coding Based on Inter-Component Prediction of Block Partitions"*, Picture Coding Symposium, Krakow, Poland, May 2012, the already coded texture information of the same view is used to generate a segmentation mask, which is used to predict the collocated depth block in intra-predicted blocks. For each of the two segments of the resulting binary segmentation mask a depth coding (DC) prediction value is derived. This shape prediction from texture to depth shall improve the prediction quality and especially the location accuracy of depth discontinuities.

A similar concept was proposed in "Description of 3D Video Technology Proposal by Fraunhofer Heinrich Hertz Institute (Fraunhofer HHI) (HEVC compatible; configuration A)", document, M22570, November 2011, Geneva, Switzerland, where wedgelet and contour partitioning for depth map coding was introduced.

Furthermore, methods to utilize a high correlation between texture and depth components in inter prediction were proposed. Reusing already coded motion information (i.e. motion vectors and reference picture indices) of the texture view to reduce the required bitrate of the same view's depth component was proposed in M. Winken, H. Schwarz, T. Wiegand, *"Motion Vector Inheritance for High Efficiency 3D Video Plus Depth Coding"*, Picture Coding Symposium, Krakow, Poland, May 2012. In that approach, the motion vector information and also the partitioning of the prediction units can be inherited from the collocated texture block when coding a depth block.

In Joint Collaborative Team on 3D Video Coding Extension Development (JCT3V) of International Telecommunication Union Telecommunication Standardization Sector (ITU-T) Video Coding Experts Group or Visual Coding Experts Group (VCEG) and International Organization for Standardization (ISO)/International Electrotechnical Commission (IEC) moving picture experts group (MPEG), "3D-CE3.h: Depth Quadtree Prediction for 3DHTM 4.1," JCT3V-B0068, Technical Report, October 2012, the authors propose to limit the block partitioning (i.e. depth of the coding quad-tree) for the depth component to the corresponding texture quad-tree. By this limitation it is possible to save bitrate for the splitting flag in the depth component, but also introduces a parsing dependency between the two components.

Synthesizing an additional prediction signal for the dependent texture views based on the already coded depth information is proposed by *"Description of 3D Video Coding Technology Proposal by Nokia"*, document M22552, November 2011, Geneva, Switzerland and C. Lee, Y.-S. Ho, "A Framework of 3D Video Coding Using View Synthesis Prediction", Picture Coding Symposium, Krakow, Poland, May 2012. Here, contents of the encoded block (pixel values) are synthesized from the reference texture view using Depth Image-Based Rendering technique that requires depth to properly map the pixel positions between the views.

In "Description of 3D Video Technology Proposal by Fraunhofer HHI (HEVC compatible; configuration A)", document M22570, November 2011, Geneva, Switzerland and *"Technical Description of Poznan University of Technology Proposal for Call on 3D Video Coding Technology"*, document M22697, November 2011, Geneva, Switzerland, candidates for prediction of motion information from the reference view that are used to encode a currently coded block are derived based on the depth values associated with the coded block.

A similar approach was proposed in *"Description of 3D Video Technology Proposal by Fraunhofer HHI (HEVC compatible; configuration A)"*, document M22570, November 2011, Geneva, Switzerland to predict the residuum from the already encoded reference view. Based on the depth estimate, a disparity vector is determined for a current block and the residual block in the reference view that is referenced by the disparity vector is used for predicting the residual of the current block.

In *"Depth-based Weighted Bi-Prediction for Video Plus Depth Map Coding"*, International Conference on Image Processing (ICIP) 2012, September 2012, merging of bi-directional inter prediction results for the coded block is done using weights which values are computed based on depth information. Different methods for calculating weights are proposed, including binary assignment to one or another area of the block.

SUMMARY

It is an object of the disclosure to provide an efficient coding solution, i.e. encoding and decoding solution, for coding texture blocks of texture images of a 3D image or 3D video.

The foregoing and other objects of the disclosure are achieved by the features of the independent claims. Further implementation forms are apparent from the dependent claims, the description and the figures.

Most of the existing solutions utilize texture-to-depth dependencies. However, despite the fact that both directions (texture-to-depth and depth-to-texture) show some advantages, in general, using depth information to reduce the texture bitrate is considered more desirable as the texture bitrate is significantly higher than the bitrate for the depth component.

Additionally, for encoding texture, prior art methods use block partitioning with regular shape of partitions or require sophisticated methods for signaling the arbitrary shape which reduces the coding performance of such methods. The inter-component dependencies to determine arbitrary shape of partitions was so far only used for depth partitioning based on texture. Determining the arbitrary shape of texture partitions based on depth information, the overall coding performance can be improved.

Aspects and implementation forms of the disclosure provide a solution for coding, i.e. encoding and decoding, texture blocks using partitioning determined based on depth information associated with this texture block. According to the disclosure, instead of using regular, typically rectangular, shaped partitions for the coding the texture block, the block is coded using a predefined number of partitions which shape is determined based on depth information and are of arbitrary, typically non-regular and in particular not rectangular, shape. As the shape of the partitions can be determined with the prior knowledge about depth information (depth-first coding), the arbitrary shape of the partitions does not need to be transmitted from the encoder to the decoder as the computations to determine the shape of partitions are repeated in the decoder. The described solution may also be referred to as depth-based block partitioning (DBBP).

Further aspects and implementation forms provide solutions to improve the texture coding using DBBP for 3D and texture-plus-depth video coding, and/or to decrease the complexity of DBBP-based video coding.

According to a first aspect, the disclosure relates to a method for encoding a texture block of a texture image, the method comprising determining a partitioning mask for the texture block based on depth information associated to the texture block, wherein the partitioning mask is adapted to define a plurality of partitions of the texture block and to associate a texture block element of the texture block to a partition of the plurality of partitions, and encoding the texture block by encoding the partitions of the plurality of partitions of the texture block based on the partitioning mask.

In other words, the method according to the first aspect uses depth based block partitioning and may also be referred to as depth based block partitioning or depth based block partitioning encoding.

Methods according to the first aspect exploit the inter-component dependencies between the texture component and the depth component. Furthermore, by using the depth information to reduce the texture bitrate the coding efficiency can be improved as the bitrate for the texture component is significantly higher than the bitrate for the corresponding depth component.

Even further, instead of using regular, for example, rectangular shaped partitions for coding the texture block, the encoding according to the first aspect allows to define arbitrary shaped partitions, wherein the arbitrary shapes of the partitions are determined based on depth information associated to the texture block to be encoded. As the areas with similar or the same texture characteristics within a texture block do typically not show regular shapes, and in particular not rectangular shapes, the arbitrary shape partitioning based on the depth information associated to the texture block facilitates a more accurate description or modeling of such arbitrary texture areas. Thus, for example, compared to the conventional rectangular shaped block partitioning, the prediction error compared to regular shape partitioning can be reduced and/or the signaling overhead needed for signaling a deep-quad-tree partitioning can be reduced.

In other words, methods according to a first aspect allow texture blocks to be divided into any kind of partitions including irregular and regular partitions. Finally, as the shape of the partitions of the texture block can be determined with the prior knowledge about the depth information associated to the texture block, the information to describe the arbitrary shape of the partitions of the texture block does not need to be transmitted from the encoder to the decoder as the computations to determine the shape of the partitions of the texture block can be efficiently performed at the decoder based on, for example decoded depth information (depth-first coding) which is associated to the encoded texture block to be decoded.

The texture image may be a texture component of a still image or a texture component of a video frame.

The depth information may be depth values of a depth map or disparity values of a disparity map.

In a first possible implementation form of the method according to the first aspect, the encoding of the partitions of the plurality of partitions comprises determining for a first partition of the plurality of partitions of the texture block separately from a second partition of the plurality of partitions of the texture block coding information to be used for encoding the first partition. The coding information may relate to or comprise information related to prediction coding of the individual segments of the texture block or to non-prediction coding of the individual segments of the texture block.

For prediction coding, the coding information may comprise one or more of the following: a prediction mode, a predictor index, a prediction direction, a reference picture index, a reference view index, a transform coefficient, a motion vector, and a coding context.

The encoding of the partitions of the plurality of partitions may be performed for each partition separately. Determining the coding information separately for some or all partitions, the prediction accuracy can be increased and, thus, the prediction error reduced.

In a second possible implementation form of the method according to the first aspect as such or according to the first implementation form of the first aspect, the number of partitions forming the plurality of partitions is predetermined or adaptively determined.

Both methods (predetermined or adaptively determined) for determining the number of partitions forming the plurality of partitions do not require additional signaling in the bitstream of the number of partitions representing the coded block. Otherwise, the encoder would have to add such information, e.g. the number of partitions, for each block that uses the depth based block partitioning to the bitstream.

In a third possible implementation form of the method according to any of the preceding implementations forms of the first aspect or the first aspect as such, the number of partitions forming the plurality of partitions is adaptively determined by analyzing the depth information associated to the texture block.

Analyzing the depth information, for example depth map values or disparity map values, associated to the texture block is less complex than analyzing the texture information, e.g. chrominance and luminance, of the texture block. Thus, the depth information can be used to determine the number of partitions of the texture block in an efficient manner. In particular on a block level, the depth information comprises typically only a very small number of ranges or depth information values relevant for dividing the depth information associated to the texture block and correspondingly the texture block reliably into the plurality of partitions. Often, only two partitions are sufficient, for example, a first partition which represents an area of a foreground object within the texture block and a second partition corresponding to the area of a background within the texture block.

In a fourth possible implementation form of the method according to any of the preceding implementation forms of the first aspect or according to the first aspect the associating, by the partitioning mask, of the texture block element of the texture block to one of the plurality of partitions is performed based on a comparison of a depth information value associated to the texture block element with a threshold value.

The use of a threshold value for determining the partitioning mask and the corresponding partitions provides a low-complexity but nevertheless efficient way of performing the segmentation, in particular in combination with the one-dimensional depth information values.

According to a fifth implementation form of the method according to the fourth implementation form, the threshold value is predetermined or adaptively determined.

Both methods (predetermined or adaptively determined) for determining the threshold value do not require additional signaling in the bitstream of the threshold value for the coded blocks. This saves the number of bits that have to be transmitted to the decoder and improves the coding performance. Otherwise, the encoder would have to add information about the threshold values for each block that uses the depth based block partitioning to the bitstream.

According to a sixth implementation form of the method according to the fourth or fifth implementation form of the first aspect, the threshold value is adaptively determined by analyzing the depth information associated to the texture block.

The adaptively determining of the threshold value may comprise calculating an average value of the depth information values for the area associated with the texture block to be encoded, and setting the threshold value to the calculated average value.

The adaptively determining of the threshold value may comprise calculating a weighted average of the depth information values for the area associated with the texture block to be encoded, wherein weights used in calculating the weighted average depend on a distance from a center of the texture block, and setting the threshold value to the calculated weighted average value.

The adaptively determining of the threshold value may comprise calculating a median value for the depth information values from the area associated with the texture block to be encoded, and setting the threshold value to the calculated median value.

The proposed implementations provide relatively simple methods of calculating the threshold value that are not computationally complex. This is especially crucial for the decoder which has usually both the power consumption and computational power constraints. Additionally, the proposed methods may be implemented with a regular structure of the algorithm which makes the hardware implementation easier.

According to a seventh implementation form of the method according to any of the first to third implementation form of the first aspect or according to the first aspect the determining the partitioning mask is performed based on applying an edge detection algorithm to an area of depth information values associated to the texture block.

Usage of information about the location of edges detected in the image representing depth information provides a simple way of determining the partitions that preserve object borders. In particular, such partitioning usually reflects the most desired partitioning to be selected by the codec to maximize the coding performance. Additionally, edge detection performed on image representing depth information is usually an easy task that is not computationally complex.

According to an eight implementation form according to any of the preceding implementation forms or according to the first aspect, the determining of the partitioning mask is performed in an iterative manner, wherein in each iteration a partition fulfilling a predetermined selection-criterion is further divided into sub-partitions until a predetermined termination-criterion is fulfilled or as long as a further-partitioning-criterion is still fulfilled, wherein the texture block performs the initial partition used for the iterative partitioning.

For the partitioning of the initial partition or for any subsequent sub-partition any of the preceding implementation forms may be used.

Such iterative partitioning method represents a regular structure of the algorithm which is relatively easy to be implemented in hardware. Also, in case of algorithm altering or tuning, modifications of any criteria need to be done once, as all of the following iterations use exactly the same processing.

According to a ninth implementation form according to any of the preceding implementation forms of the first aspect or according to the first aspect, the method further comprises multiplexing an coding mode indicator to a bit-stream comprising coding information of the encoded partitions of the plurality of partitions of the plurality of partitions of the texture block, wherein the coding mode indicator indicates whether the partitioning of the texture block was performed using a partitioning mask derived based on depth information associated to the texture block, and/or wherein the coding mode indicator indicates whether a specific partitioning mode of a plurality of different partitioning modes using a partitioning mask derived based on depth information associated to the texture block was used.

Such a way of signaling the usage of the depth based block partitioning proposed by the disclosure is very flexible and provides an easy implementation into the structure (syntax and semantics) of the existing video codecs.

According to a tenth implementation form of the method according to any of the preceding implementation forms of the first aspect or according to the first aspect, the method further comprises encoding and decoding depth information associated to the texture block to obtain the depth information used for determining the partitioning mask.

By using the already encoded and decoded depth information instead of the original depth information, the encoder uses the same depth information that will be available for the decoder, and thus, can calculate the prediction error more accurately, which may be transmitted to the decoder to allow a more accurate reconstruction of the original texture block at the decoder side.

According to a second aspect of the disclosure, the disclosure relates to a method for encoding a texture block of a texture image, the method comprising: encoding the texture block according to a depth based block partitioning coding mode as specified by the first aspect or any of its implementation forms, encoding the texture block using one or a plurality of regular shaped partitioning coding modes, and selecting, based on a selection criterion, one of the aforementioned coding modes for transmission of the encoded texture block.

By using the method for encoding according to the first aspect of any of its implementation forms in combination with other coding modes, in particular regular shaped partitioning coding modes the most suitable coding mode, most suitable for example with regard to coding efficiency, can be selected for transmission.

According to a first implementation form of the second aspect, the selecting comprises comparing an encoding cost of the depth based block partitioning coding mode with an encoding cost of the one regular shaped partitioning coding mode or encoding costs of the plurality of regular shaped partitioning coding modes, and selecting the depth based block partitioning coding mode in case the encoding cost for the depth based block partition coding mode is lower than the encoding cost of the one regular shaped partitioning encoded mode or is lower than all encoding costs of the plurality of regular shaped partitioning coding modes.

According to a second implementation form of the method according to the first implementation form of the second aspect or according to the second aspect, the selecting one of the aforementioned coding modes for encoding the texture block is performed per texture block and/or wherein the method further comprises: enabling or disabling the depth based block partitioning coding mode per group of pictures (GOP), per intra-period, per image, per slice, per coding unit or per macroblock, wherein the enabling or disabling indication for the depth based block partitioning coding mode is signaled in the sequence parameter set (SPS), picture parameter set (PPS), prediction block set (PBS), video parameter set (VPS), picture header, slice header (SH), macroblock or in the coding unit syntax.

Selecting the coding mode per texture block allows the coding efficiency to be improved as the most suitable coding mode is used.

Enabling or disabling the possibility to use the depth based block partitioning coding mode on a larger scale allows to reduce the signaling overhead for portions of the texture image which are considered less suitable for the depth based block partitioning of portions of the texture image and for which other coding modes, including regular shaped based coding modes, are considered more suitable, for example due to a statistical analysis of portions of the texture.

According to a third implementation form of the method according to the first or second implementation form of the second aspect or according to the second aspect, the plurality of selectable coding modes comprises a set of coding modes based on regular shaped partitioning and one depth based block partitioning coding mode, wherein each coding mode based on the regular shaped partitioning has a mode specific coding mode indicator associated to it, which distinguishes the respective regular shaped partitioning coding mode from the other regular shaped partitioning modes, and wherein the selection of the depth based partitioning coding mode is signaled by adding a flag to only one of the coding mode indicators of the set of coding mode indicators, wherein a first value of the flag indicates that the regular shaped partitioning coding mode associated to the coding mode indicator was selected, and a second value of the flag signals that the depth based block partitioning coding mode was selected.

By adding the flag to only one of the coding mode indicators, the overall coding performance can be increased. E.g., the flag can be added to the mode indicator that is less frequently used due to the usage of the proposed method. This way, mode indicators of other, frequently used modes are not affected by additional flag and the overall bitrate can be reduced.

According to a fourth implementation form of the method according to any of the preceding implementation forms of the second aspect or according to the second aspect, the method further comprises mapping the partitioning mask to a regular shaped partition, and encoding a consecutive texture block based on the regular shaped partitioning representation of the partitioning mask or on information derived based on the regular shaped partitioning representation of the partitioning mask.

The encoding used for encoding the consecutive texture block may be performed using the depth based block partitioning encoding according to the first or second aspect or any of their implementation forms or using a regular shaped partitioning coding mode.

According to a third aspect, the disclosure relates to a computer program with a program code for performing a method according to aspect one or any of its implementation forms and/or according to aspect two and any of its implementation forms, when the computer program runs on a computer.

According to a fourth aspect, the disclosure relates to a computer program product comprising a computer readable storage medium storing program code thereon for use by an encoding apparatus, the program comprising instructions for executing a method according to the first aspect and any of its implementation forms, and/or according to the second aspect and any of its implementation forms.

According to a fifth aspect, the disclosure relates to an encoding apparatus configured to execute the method according to the first aspect or any of its implementation forms, and/or according to the second aspect and any of its implementation forms.

The encoding apparatus may comprise a processor configured to execute the method according to the first aspect or any of its implementation forms, and/or according to the second aspect and any of its implementation forms.

The computer and/or the processor thereof may be programmed to execute the computer program for performing the method according to the third aspect.

The computer and/or the processor thereof may be programmed to use the program code stored on the computer readable storage medium of the computer program product according to the fourth aspect and to execute the instructions comprised in the program code for executing a method according to the first aspect and any of its implementation forms and/or according to the second aspect and any of its implementation forms.

According to a sixth aspect, the disclosure relates to an encoding apparatus for encoding a texture block of a texture image, the encoding apparatus comprising a partitioner adapted to determine a partitioning mask for the texture block based on depth information associated to the texture block, wherein the partitioning mask is adapted to define a plurality of partitions of the texture block and to associate a texture block element of the texture block to a partition of the plurality of partitions, and an encoder adapted to encode the texture block by encoding the partitions of the plurality of partitions of the texture block based on the partitioning mask.

The encoding apparatus may also be referred to as depth based block partitioning encoding apparatus.

In a first possible implementation form of the apparatus according to the sixth aspect, the encoder is adapted to determine for a first partition of the plurality of partitions of the texture block separately from a second partition of the plurality of partitions of the texture block coding information to be used for encoding the first partition.

The coding information may relate to or comprise information related to prediction coding of the individual segments of the texture block or to non-prediction coding of the individual segments of the texture block.

For prediction coding, the coding information may comprise one or more of the following: a prediction mode, a predictor index, a prediction direction, a reference picture index, a reference view index, a transform coefficient, a motion vector, and a coding context.

The encoder may be adapted to perform the encoding of the partitions of the plurality of partitions for each partition separately. By determining the coding information separately for some or all partitions, the prediction accuracy can be increased and, thus, the prediction error reduced.

In a second possible implementation form of the apparatus according to the sixth aspect as such or according to the first implementation form of the sixth aspect, the number of partitions forming the plurality of partitions is predetermined or adaptively determined, for example by the partitioner.

In a third possible implementation form of the apparatus according to any of the preceding implementations forms of the sixth aspect or the sixth aspect as such, the number of partitions forming the plurality of partitions is adaptively determined by the partitioner by analyzing the depth information associated to the texture block.

According to a fourth implementation form of the apparatus according to any of the preceding implementation forms of the sixth aspect or according to the sixth aspect the partitioner is adapted to associate, by the partitioning mask, the texture block element of the texture block to one of the plurality of partitions based on a comparison of a depth information value associated to the texture block element with a threshold value.

According to a fifth implementation form of the apparatus according to the fourth implementation form, the threshold value is predetermined or adaptively determined, e.g. by the partitioner.

According to a sixth implementation form of the apparatus according to the fourth or fifth implementation form of the sixth aspect, the threshold value is adaptively determined, e.g. by the determiner, by analyzing the depth information associated to the texture block.

The adaptively determining of the threshold value may comprise calculating an average value of the depth information values for the area associated with the texture block to be encoded; and setting the threshold value to the calculated average value.

The adaptively determining of the threshold value, e.g. by the partitioner, may comprise calculating a weighted average of the depth information values for the area associated with the texture block to be encoded, wherein weights used in calculating the weighted average depend on a distance from a center of the texture block; and setting the threshold value to the calculated weighted average value.

The adaptively determining of the threshold value, e.g. by the partitioner, may comprise calculating a median value for the depth information values from the area associated with the texture block to be encoded; and setting the threshold value to the calculated median value.

According to a seventh implementation form of the apparatus according to any of the first to third implementation form of the sixth aspect or according to the sixth aspect the partitioner is adapted to determine the partitioning mask based on applying an edge detection algorithm to an area of depth information values associated to the texture block.

According to an eight implementation form of the apparatus according to any of the preceding implementation forms or according to the sixth aspect, the partitioner is adapted to determine the partitioning mask in an iterative manner, wherein in each iteration a partition fulfilling a predetermined selection-criterion is further divided into sub-partitions until a predetermined termination-criterion is fulfilled or as long as a further-partitioning-criterion is still fulfilled, wherein the texture block performs the initial partition used for the iterative partitioning.

For the partitioning of the initial partition or for any subsequent sub-partition any of the preceding implementation forms may be used.

According to a ninth implementation form of the apparatus according to any of the preceding implementation forms of the sixth aspect or according to the sixth aspect, the encoding apparatus further comprises a multiplexer adapted to multiplex an coding mode indicator to a bit-stream comprising coding information of the encoded partitions of the plurality of partitions of the plurality of partitions of the texture block, wherein the coding mode indicator indicates whether the partitioning of the texture block was performed using a partitioning mask derived based on depth information associated to the texture block, and/or wherein the coding mode indicator indicates whether a specific partitioning mode of a plurality of different partitioning modes using a partitioning mask derived based on depth information associated to the texture block was used.

According to a tenth implementation form of the apparatus according to any of the preceding implementation forms of the sixth aspect or according to the sixth aspect, the encoding apparatus further comprises an encoder adapted to encode the depth information associated to the texture block, and a decoder to decode the depth information encoded by the encoder to obtain the depth information associated to the texture block used for determining the partitioning mask.

According to a seventh aspect of the disclosure, the disclosure relates to a multimode encoding apparatus for encoding a texture block of a texture image, the encoding apparatus comprising an encoding apparatus for encoding the texture block according to a depth based block partitioning coding mode as specified by the sixth aspect or any of its implementation forms, a further encoding apparatus adapted to encode the texture block using one or a plurality of regular shaped partitioning coding modes, and a selector adapted to select, based on a selection criterion, one of the aforementioned coding modes for transmission of the encoded texture block.

According to a first implementation form of the multimode encoding apparatus according to the seventh aspect, the selector is further adapted to compare an encoding cost of the depth based block partitioning coding mode with an encoding cost of the one regular shaped partitioning coding mode or encoding costs of the plurality of regular shaped partitioning coding modes, and to select the depth based block partitioning coding mode in case the encoding cost for the depth based block partition coding mode is lower than the encoding cost of the one regular shaped partitioning encoded mode or is lower than all encoding costs of the plurality of regular shaped partitioning coding modes.

According to a second implementation form of the multimode encoding apparatus according to the first implementation form of the seventh aspect or according to the seventh aspect, the selector is adapted to select one of the aforementioned coding modes for encoding the texture block per texture block; and/or is adapted to enable or disable the depth based block partitioning coding mode per GOP, per intra-period, per image, per slice, per macroblock or per coding unit, wherein the selector is adapted to signal an enabling or disabling indication for the depth based block partitioning coding mode in the SPS, PPS, PBS, VTS, picture header, SH, macroblock or in the coding unit syntax.

According to a third implementation form of the multimode encoding apparatus according to the first or second implementation form of the seventh aspect or according to the seventh aspect, the plurality of selectable coding modes comprises a set of coding modes based on regular shaped partitioning and one depth based block partitioning coding mode, wherein each coding mode based on the regular shaped partitioning has a mode specific coding mode indicator associated to it, which distinguishes the respective regular shaped partitioning coding mode from the other regular shaped partitioning modes, and wherein the selector is adapted to signal the selection of the depth based partitioning coding mode by adding a flag to only one of the coding mode indicators of the set of coding mode indicators, wherein a first value of the flag indicates that the regular shaped partitioning coding mode associated to the coding mode indicator was selected, and a second value of the flag signals that the depth based block partitioning coding mode was selected.

According to a fourth implementation form of the multimode encoding apparatus according to any of the preceding implementation forms of the seventh aspect or according to the seventh aspect, the encoding apparatus is adapted map the partitioning mask to a regular shaped partition, and wherein the encoding apparatus comprises a texture encoder adapted to encode a consecutive texture block based on the regular shaped partitioning representation of the partitioning mask or on information derived based on the regular shaped partitioning representation of the partitioning mask.

The texture encoder can be the encoder or the encoding apparatus according to the first aspect or any of its implementation forms, or an additional encoder adapted to encode the consecutive texture using a regular shaped partitioning coding mode.

According to an eighth aspect of the disclosure, the disclosure relates to a method for decoding an encoded texture block of a texture image, the method comprising determining a partitioning mask for the encoded texture block based on depth information associated to the encoded texture block, wherein the partitioning mask is adapted to define a plurality of partitions and to associate a texture block element of the encoded texture block to a partition of the plurality of partitions of the encoded texture block; and decoding the partitions of the plurality of partitions of the encoded texture block based on the partitioning mask.

In a first possible implementation form of the method according to the eighth aspect, the decoding of the partitions of the plurality of partitions comprises extracting, from a bitstream, coding information for a first partition of the plurality of partitions of the encoded texture block separately from coding information for a second partition of the plurality of partitions of the texture block, wherein the coding information is used for decoding the first partition.

The coding information may relate to prediction or non-prediction coding. The coding information is used for decoding the first partition and may comprise one or more of the following: a prediction mode, a predictor index, a prediction direction, a reference picture index, a reference view index, transform coefficient, a motion vector, and, a coding context.

In a second possible implementation form of the method according to the first implementation form of the eighth aspect or according to the eighth aspect, the number of partitions forming the plurality of partitions is predetermined or adaptively determined.

In a third possible implementation form of the method according to the first or second implementation form of the eighth aspect or according to the eighth aspect, the number of partitions forming the plurality of partitions is adaptively determined by analyzing the depth information associated to the texture block.

In a fourth possible implementation form of the method according to any of the preceding implementation forms of the eighth aspect or according to the eighth aspect, the number of partitions forming the plurality of partitions is determined by analyzing a histogram of depth information values associated to the texture block, for example by counting a number of peaks in the histogram and setting the number of partitions forming the plurality of partitions equal to the number of counted peaks.

In a fifth possible implementation form of the method according to any of the preceding implementation forms of the eighth aspect or according to the eighth aspect, the associating, by the partitioning mask, of the texture block element of the texture block to one of the plurality of partitions is performed based on a comparison of a depth information value associated to the texture block element with a threshold value.

In a sixth possible implementation form of the method according to the fifth implementation form of the eighth aspect, the threshold value is predetermined or adaptively determined.

In a seventh possible implementation form of the method according to the sixth implementation forms of the eighth aspect, the adaptively determining of the threshold value comprises calculating an average value of the depth information values for the area associated with the texture block to be encoded, and setting the threshold value to the calculated average value, or calculating a weighted average of the depth information values for the area associated with the texture block to be encoded, wherein weights used in calculating the weighted average depend on a distance from a center of the texture block, and setting the threshold value to the weighted average value, or calculating a median value for the depth information values from the area associated with the texture block to be encoded, and setting the threshold value to the calculated median value.

In an eighth possible implementation form of the method according to any of the preceding implementation forms of the eighth aspect or according to the eighth aspect, the determining the partitioning mask is performed based on applying an edge detection algorithm to an area of depth information values associated to the texture block.

In a ninth possible implementation form of the method according to any of the preceding implementation forms of the eighth aspect or according to the eighth aspect, the determining of the partitioning mask is performed in an iterative manner, wherein in each iteration a partition fulfilling predetermined selection criteria is further divided into sub-partitions until a predetermined termination-criterion is fulfilled or as long as a further-partitioning-criterion is still fulfilled, wherein the texture block performs the initial partition used for the iterative partitioning.

In a tenth possible implementation form of the method according to any of the preceding implementation forms of the eighth aspect or according to the eighth aspect, the method further comprises extracting an coding mode indicator from a bitstream comprising coding information of the encoded partitions of the plurality of partitions of the texture block, wherein the coding mode indicator indicates whether the partitioning of the texture block was performed using a partitioning mask derived based on depth information associated to the texture block, and/or wherein the coding mode indicator indicates whether a specific partitioning mode of a plurality of different partitioning modes using a partitioning mask derived based on depth information associated to the texture block was used.

According to a ninth aspect of the disclosure, the disclosure relates to a method for decoding a texture block of a texture image, the method comprising receiving a bitstream comprising coding information of the encoded partitions of the plurality of partitions of the texture block, extracting a coding mode indicator from the bitstream, the coding mode indicator indicating which coding mode of a plurality of coding modes has been used to encode the texture block, and decoding the encoded texture block according to a depth based block partitioning decoding mode according to the eighth aspect or any of its implementation forms in case the coding mode indicator indicates a corresponding depth based block partitioning coding mode was used to encode the texture block.

In a first possible implementation form of the method according to the ninth aspect, the extracting the coding mode indicator for determining the decoding mode of the plurality of decoding modes to be used for decoding the encoded texture block is performed per texture block.

In a second possible implementation form of the method according to the first implementation form of the ninth aspect or according to the ninth aspect, the method further comprises: extracting an enabling or disabling indicator from the bitstream per GOP, per intra-period, per image, per slice or per coding unit, wherein the enabling or disabling indication for the depth based block partitioning coding mode is signaled in the SPS, PPS, PBS, VPS, picture header, SH, macroblock or in the coding unit syntax, the enabling or disabling indicator indicating whether the depth based block partitioning coding mode is enabled or disabled for texture blocks received after the enabling or disabling indicator.

In a third possible implementation form of the method according to the first or second implementation form of the ninth aspect or according to the ninth aspect, the plurality of coding modes comprises a set of coding modes based on regular shaped partitioning and one depth based block partitioning coding mode, wherein each coding mode based on the regular shaped partitioning has a mode specific coding mode indicator associated to it, which distinguishes the respective regular shaped partitioning coding mode from the other regular shaped partitioning coding modes, wherein the selection of the depth based block partitioning coding mode is signaled by adding a flag to only one of the coding mode indicators of the set of coding mode indicators, wherein a first value of the flag indicates that the regular shaped partitioning coding mode associated to the coding mode indicator was selected, and a second value of the flag signals that the depth based block partitioning coding mode was selected.

According to a fourth implementation form of the method according to any of the preceding implementation forms of the ninth aspect or according to the ninth aspect, the method further comprises mapping the partitioning mask to a regular shaped partition; and decoding a consecutive encoded texture block based on the regular shaped partitioning representation of the partitioning mask or on information derived based on the regular shaped partitioning representation of the partitioning mask.

The decoding used for encoding the consecutive texture block may be performed using the depth based block partitioning decoding according to the eighth or ninth aspect or any of their implementation forms or using a regular shaped partitioning decoding mode.

According to a tenth aspect, the disclosure relates to a computer program with a program code for performing a method according to the eighth aspect or any of its implementation forms and/or according to the ninth aspect or any of its implementation forms, when the computer program runs on a computer.

According to an eleventh aspect, the disclosure relates to a computer program product comprising a computer readable storage medium storing program code thereon for use by a decoding apparatus, the program comprising instructions for executing a method according to the eighth aspect or any of its implementation forms, and/or according to the ninth aspect or any of its implementation forms.

According to a twelfth aspect, the disclosure relates to a decoding apparatus configured to execute the method according to the eighth aspect or any of its implementation forms, and/or according to the ninth aspect or any of its implementation forms.

The decoding apparatus may comprise a processor configured to execute the method according to the eighth aspect or any of its implementation forms, and/or according to the ninth aspect or any of its implementation forms.

The computer and/or the processor thereof may be programmed to execute the computer program according to the tenth aspect.

The computer and/or the processor thereof may be programmed to use the program code stored on the computer readable storage medium of the computer program product according to the eleventh aspect and to execute the instructions comprised in the program code.

According to a thirteenth aspect, the disclosure relates to a decoding apparatus for decoding an encoded texture block of a texture image, the decoding apparatus comprising a partitioner adapted to determine a partitioning mask for the encoded texture block based on depth information associated to the encoded texture block, wherein the partitioning mask is adapted to define a plurality of partitions and to associate a texture block element of the encoded texture block to a partition of the plurality of partitions of the encoded texture block, and a decoder adapted to decode the partitions of the plurality of partitions of the encoded texture block based on the partitioning mask.

In a first possible implementation form of the decoding apparatus according to the thirteenth aspect, the decoding apparatus further comprises a demultiplexer adapted to extract encoded depth information from a bitstream, and a depth decoder is adapted to decode the encoded depth information to obtain the depth information associated to the encoded texture block.

In a second possible implementation form of the decoding apparatus according to the first implementation form of the thirteenth aspect or according to the thirteenth aspect, the demultiplexer is adapted to extract from a bitstream coding information for a first partition of the plurality of partitions of the encoded texture block separately from coding information for a second partition of the plurality of partitions of the texture block, wherein the decoder is adapted to decode the first partition using the coding information.

The coding information may relate to prediction or non-prediction coding. The coding information is used for decoding the first partition and may comprise one or more of the following: a prediction mode, a predictor index, a prediction direction, a reference picture index, a reference view index, transform coefficient, a motion vector, and, a coding context.

In a third possible implementation form of the decoding apparatus according to the first or second implementation form of the thirteenth aspect or according to the thirteenth aspect, the number of partitions forming the plurality of partitions is predetermined or adaptively determined, e.g. by the partitioner.

In a fourth possible implementation form of the decoding apparatus according to any of the preceding implementation forms of the thirteenth aspect or according to the thirteenth aspect, the partitioner is adapted to adaptively determine the number of partitions forming the plurality of partitions by analyzing the depth information associated to the texture block.

In a fifth possible implementation form of the decoding apparatus according to the first implementation form of the thirteenth aspect or according to the thirteenth aspect, the partitioner is adapted to determine the number of partitions forming the plurality of partitions by analyzing a histogram of depth information values associated to the texture block, for example by counting a number of peaks in the histogram and setting the number of partitions forming the plurality of partitions equal to the number of counted peaks.

In a sixth possible implementation form of the decoding apparatus according to the first implementation form of the thirteenth aspect or according to the thirteenth aspect, the partitioner is adapted to associate the texture block element of the texture block to one of the plurality of partitions based on a comparison of a depth information value associated to the texture block element with a threshold value.

In a seventh possible implementation form of the decoding apparatus according to the sixth implementation form of the thirteenth aspect, the threshold value is predetermined or adaptively determined, e.g. by the partitioner.

In an eighth possible implementation form of the decoding apparatus according to the seventh implementation form of the thirteenth aspect, the partitioner is adapted to adaptively determine the threshold value by calculating an average value of the depth information values for the area associated with the texture block to be encoded, and setting the threshold value to the calculated average value, or calculating a weighted average of the depth information values for the area associated with the texture block to be encoded, wherein weights used in calculating the weighted average depend on a distance from a center of the texture block, and setting the threshold value to the weighted average value, or calculating a median value for the depth information values from the area associated with the texture block to be encoded, and setting the threshold value to the calculated median value.

In a ninth possible implementation form of the decoding apparatus according to any of the preceding implementation forms of the thirteenth aspect or according to the thirteenth aspect, the partitioner is adapted to determine the partitioning mask based on applying an edge detection algorithm to an area of depth information values associated to the texture block.

In a tenth possible implementation form of the decoding apparatus according to any of the preceding implementation forms of the thirteenth aspect or according to the thirteenth aspect, the partitioner is adapted to determining the partitioning mask in an iterative manner, wherein in each iteration a partition fulfilling predetermined selection criteria is further divided into sub-partitions until a predetermined termination-criterion is fulfilled or as long as a further-partitioning-criterion is still fulfilled, wherein the texture block performs the initial partition used for the iterative partitioning.

In an eleventh possible implementation form of the decoding apparatus according to any of the preceding implementation forms of the thirteenth aspect or according to the thirteenth aspect, the decoding apparatus further comprises a demultiplexer adapted to extract an coding mode indicator from a bitstream comprising coding information of the encoded partitions of the plurality of partitions of the texture block, wherein the coding mode indicator indicates whether the partitioning of the texture block was performed using a partitioning mask derived based on depth information associated to the texture block, and/or wherein the coding mode indicator indicates whether a specific partitioning mode of a plurality of different partitioning modes using a partitioning mask derived based on depth information associated to the texture block was used.

According to a fourteenth aspect, the disclosure relates to a multimode decoding apparatus the method comprising a receiver adapted to receive a bitstream comprising coding information of the encoded partitions of the plurality of partitions of the texture block, a demultiplexer adapted to extract a coding mode indicator from the bitstream, the coding mode indicator indicating which coding mode of a plurality of coding modes has been used to encode the texture block, and a depth based block partitioning decoding apparatus according to the eleventh aspect or any of its implementation forms adapted to decode the encoded texture block according to a depth based block partitioning decoding mode in case the coding mode indicator indicates a corresponding depth based block partitioning coding mode was used to encode the texture block.

In a first possible implementation form of the multimode decoding apparatus according to the fourteenth aspect, the demultiplexer is adapted to extract the coding mode indicator for determining the decoding mode of the plurality of decoding modes to be used for decoding the encoded texture block per texture block.

In a second possible implementation form of the multimode decoding apparatus according to the first implementation form of the fourteenth aspect or according to fourteenth aspect, the demultiplexer is adapted to extract an enabling or disabling indicator from the bitstream per GOP, per intra-period, per image, per slice, per macroblock or per coding unit, wherein the enabling or disabling indication for the depth based block partitioning coding mode is signaled in the SPS, PPS, PBS, VPS, picture header, SH, macroblock or in the coding unit syntax, the enabling or disabling indicator indicating whether the depth based block partitioning coding mode is enabled or disabled for texture blocks received after the enabling or disabling indicator.

In a third possible implementation form of the multimode decoding apparatus according to the first or second implementation form of the fourteenth aspect or according to fourteenth aspect, the plurality of coding modes comprises a set of coding modes based on regular shaped partitioning and one depth based block partitioning coding mode, wherein each coding mode based on the regular shaped partitioning has a mode specific coding mode indicator associated to it, which distinguishes the respective regular shaped partitioning coding mode from the other regular shaped partitioning coding modes, and wherein the selection of the depth based block partitioning coding mode is signaled by a flag added to only one of the coding mode indicators of the set of coding mode indicators, wherein a first value of the flag indicates that the regular shaped partitioning coding mode associated to the coding mode indicator was selected, and a second value of the flag signals that the depth based block partitioning coding mode was selected.

In a fourth possible implementation form of the multimode decoding apparatus according to any of the preceding implementations form of the fourteenth aspect or according to fourteenth aspect, the depth based block partitioning apparatus is adapted to map the partitioning mask to a regular shaped partition; and wherein the apparatus comprises a texture decoder adapted to decode a consecutive encoded texture block based on the regular shaped partitioning representation of the partitioning mask or on information derived based on the regular shaped partitioning representation of the partitioning mask.

The texture decoder can be the decoder of the depth based block partitioning apparatus or an additional texture decoder adapted to decode the consecutive encoded texture block based on a regular shaped partitioning coding mode.

Aspects of the disclosure and their implementation forms can be implemented in hardware and/or software or in combinations of both. They may be implemented as software in a digital signal processor (DSP), in a micro-controller or in any other side processer or as hardware circuit within an application specific integrated circuit (ASIC).

Aspects of the disclosure and any of their implementation forms can be implemented in digital electronic circuitry, or in computer hardware, firmware, software, or in combinations thereof.

BRIEF DESCRIPTION OF THE DRAWINGS

Further embodiments of the disclosure will be described with respect to the following figures, in which:

FIG. 9 shows an exemplary computer code according to a decoding embodiment of the disclosure;

Equal or equivalent elements are denoted in the following description of the figures by equal or equivalent reference signs.

DETAILED DESCRIPTION OF EMBODIMENTS OF THE DISCLOSURE

For a better understanding of the embodiments of the disclosure certain terms used for describing the embodiments of the disclosure will be explained based on FIG. 1.

Figure 1:
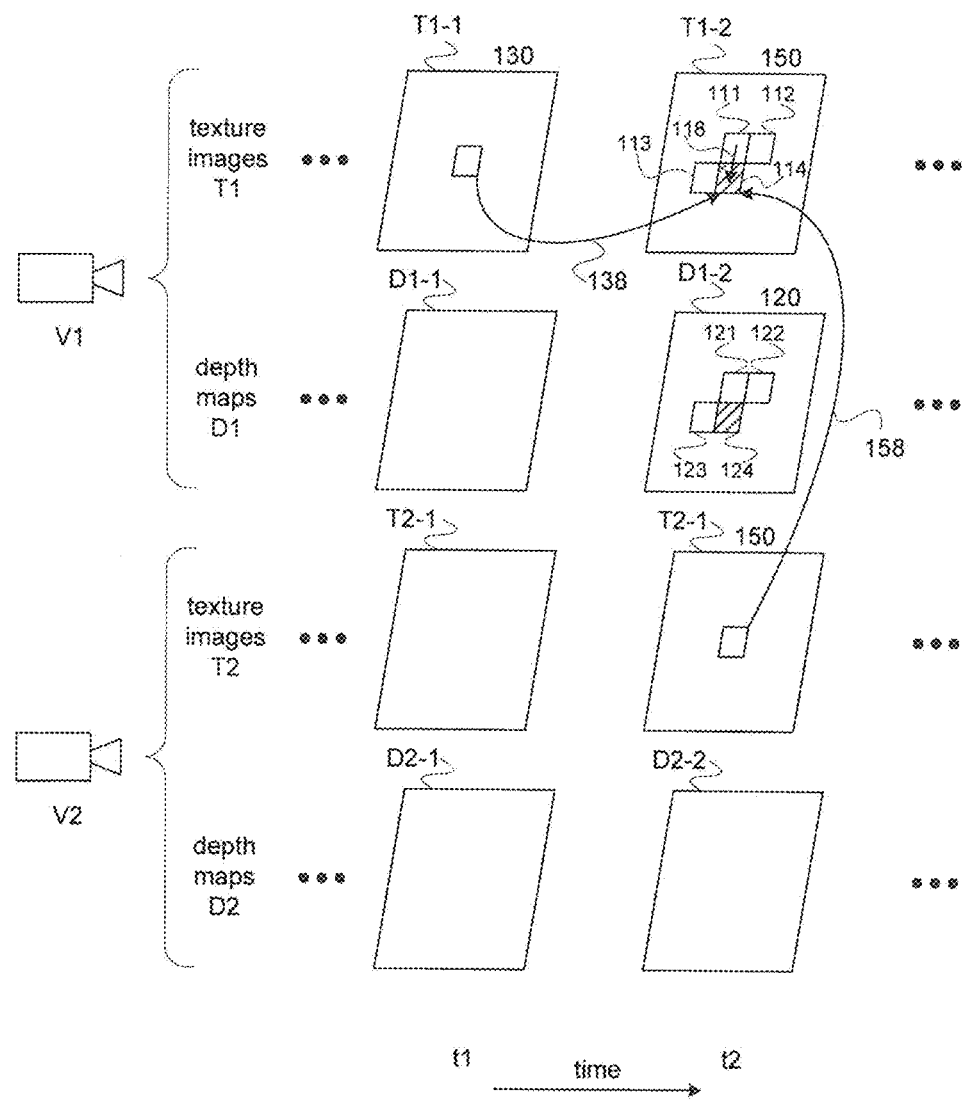
FIG. 1 shows a framework for a texture-plus-depth representation of an image as used, for example, in multi-view video-plus-depth coding.

FIG. 1 shows a typical 3D video or multi-view video frame work, where each view of a 3D visual scene is represented by a corresponding pair of texture image T and a depth map D. In 3D or multi-view video-plus-depth coding, a depth map D needs to be encoded besides the conventional video data, which is also referred to as texture data T, to not only represent the conventional two-dimensional (2D) video data like luminance and chrominance but also the corresponding depth information related to the conventional video data.

FIG. 1 shows for a first view V1, symbolically depicted by a camera, the texture images T1 and their corresponding depth maps D1 for the first view. The texture image T1-1 130 and the corresponding depth map D1-1 represent the first view V1 of a 3D visual scene at a first time t1, whereas the texture image T1-2 150 and the corresponding depth map D1-2 120 represent the first view V1 of the 3D visual scene at a second time instance t2. The same holds for the second view V2 of the 3D visual scene, which is also depicted in FIG. 1, wherein texture image T2-1 and the corresponding depth map D2-1 represent the second view V2 at the first time instance t1, and the texture image T2-2 and the corresponding depth map D2-2 represent the second view at the second time instance t2. Such a texture-plus-depth representation of views of a 3D visual scenes allows to decouple the capture and transmission format from the display format because based on the texture images and corresponding depth maps of two views a 3D image may be rendered on a 3D capable display independent of its size and resolution and allows even the creation of synthetic virtual views. Instead of a depth map, a disparity map may be used to provide the depth information associated to the texture image.

For video coding, the texture image is divided into small parts, called blocks, for example, macro blocks or coding units (CU). In the coding process, the encoder decides about the coding mode for each block, including the possibility to divide each block into smaller sub-parts. This process is usually referred to as block partitioning. As a result, each block may consist of one or more partitions. In recent video codecs, usually rectangular shaped partitions, i.e. partitions of a rectangular shape, are allowed. Additionally, for each block or partition a prediction mode is selected. As the predictive coding is a very efficient method for encoding video content, for each block to be encoded a reference block, which was already encoded prior to the coded block is selected. Such a block is set as a reference for the block to be encoded and only prediction errors with respect to this reference block need to be signaled in the bitstream of the encoded video. A reference block can be selected from blocks of the same picture as the block to be encoded, which is also referred to as intra-picture prediction, or one of the available previously encoded pictures, which is also referred to as inter-picture prediction. For intra-picture-prediction, also referred to as intra-image prediction or short intra prediction, each partition of the block to be encoded is predicted using one or more selected directional predictors. In the inter-picture prediction, also referred to as inter-image prediction or short as inter-prediction, a method known as motion estimation can be applied, which uses motion vectors to specify the spatial location of the reference block in the reference picture relatively to the spatial position of the block to be encoded in the current picture. Additionally, the reference picture needs to be specified, which is typically indicated by a reference picture index. For each partition of the block to be encoded, an independent set of motion vectors and reference picture indices can be selected by the encoder. Consequently, the inter-prediction may be different for each partition. In 3D video additionally an inter-view prediction can be used which allows to use blocks of other views as reference.

Finally, the prediction area, also referred to residuum, i.e., the difference between the prediction of the coded block and the reference block is encoded and transmitted in the bitstream.

FIG. 1, further shows four exemplary neighboring blocks 111, 112, 113 and 114 of the texture image T1-2 150. FIG. 1 shows further the depth map D1-2 120 corresponding to the texture image T1-2 150, which comprises the corresponding depth map blocks, wherein depth map block 121 corresponds to texture block 111, depth map block 122 corresponds to texture block 112, depth map block 123 corresponds to texture block 113 and depth map block 124 corresponds to texture block 114 as they represent the same area of the same view at the same time. For example, depth map block 124 contains the depth map values corresponding to the texture values of texture block 114.

As mentioned above, texture values of the texture block 114 or texture values of partitions of the texture block 114 can be predicted using reference blocks or reference partitions of reference blocks from the same texture image, from a texture image of a different view for the same time instant, for example T2-1, or from a texture image of the same view T1 from a previously coded, for example T1-1. FIG. 1 shows an example for intra coding, see arrow 118 indicating a prediction of the texture block 114 using the neighboring texture block 111. FIG. 1 shows also an example for inter-view prediction, see arrow 158 pointing from a texture block of texture image T2-2150 to the texture block 114 of texture T1-2. Finally, FIG. 1 also shows an example of an inter prediction, see arrow 138 pointing from a texture block of the texture image T1-1 130 to the texture block 114 of texture image T1-2 110.

The following terms will be used for describing the embodiments of the disclosure.

The term "image" refers to a two-dimensional representation of data, typically a two-dimensional matrix, and may also be referred to as picture.

The term "visual scene" refers to a real world or synthetic scene that is acquired with a visual system (e.g. single camera or multiple cameras) and represented in form of a still image or video.

The term "3D video frame" refers to a signal comprising information describing 3D geometry of the scene. In particular, this information can be represented by at least two texture images associated with two different viewpoints of the visual scene (stereo image) or at least one texture and depth/disparity map (texture-plus-depth image). An individual 3D video frame may also be referred to as 3D image or 3D picture.

The term "3D video sequence" refers to a set of subsequent 3D video frames representing a motion picture.

The term "texture image" refers to an image, still image or as frame of a video sequence, representing a specific viewpoint, containing information about color and light intensity of the visual scene with regard to the specific viewpoint, typically represented in red, green and blue (RGB) or comprising chrominance and luminance values (YUV) format. Typically a two-dimensional matrix comprising texture information, for example chrominance and luminance values.

The term "depth map" refers to a two-dimensional matrix comprising for each matrix element a corresponding depth value determining the distance to a physical or virtual camera of the visual scene. The depth map can be regarded as a grey scale image in which each grey value corresponds to a depth value or distance. Alternatively, a disparity may be used for determining the depth aspect of the 3D visual scene. The disparity values of the disparity map are inversely proportional to the depth values of the depth map.

The term "disparity map" refers to a two-dimensional representation of the three-dimensional visual scene wherein a value of each element is inversely proportional to the distance of the 3D world point represented by this element to the camera.

The term "coding block" or "block" is a coding unit, usually of regular, rectangular shape, describing the encoded area of the picture or image using a syntax specified for a coding mode selected for the block.

The term "coding mode" describes a set of means and methods used to code, i.e. encode and/or decode, the coded block.

The term "slice" refers to a structure of a video sequence containing a part of the whole picture or image of the video sequence.

The term "slice header" refers to a set of parameters describing the slice, which is sent at the beginning of the slice.

The term "coding unit" (CU) refers to a basic coding structure of the video sequence of a predefined size, containing a part of a picture (texture or depth), for example, a part comprising 64×64 pixels.

The term "coded block" refers to the area of the image that is encoded which corresponds to the area represented by the coding unit or is a part of this area.

The term "I-slice" refers to a slice in which all coding units are intra-predicted, so no reference to other pictures is allowed.

The term "random access point" defines a point in the structure of the video sequence (2D and 3D) from which a decoder is able to start decoding the sequence without the knowledge of the previous part of the video stream.

The term "group of pictures" (GOP) refers to one of the basic data structures of a video sequence, containing a predefined number of subsequent pictures (texture or depth or both) that are not necessarily ordered within the GOP in the display order.

The term "sequence parameter set" (SPS) refers to a set of parameters sent in form of an organized message containing basic information required to properly decode the video stream and must be signaled at the beginning of every random access point.

The term "picture parameter set" (PPS) refers to a set of parameters sent in the form of an organized message containing basic information required to properly decode a picture in a video sequence.

The term "supplemental enhancement information" (SEI) refers to a message that can be signaled in a stream of a video sequence, containing additional or optional information about the video sequence, coding tools etc.

The term "reference block" refers to a block (texture block or depth block) of a picture (texture or depth) which is used to encode the current block in prediction coding (and decoding) and is used as a reference for predictive coding of the current block.

Figure 2:
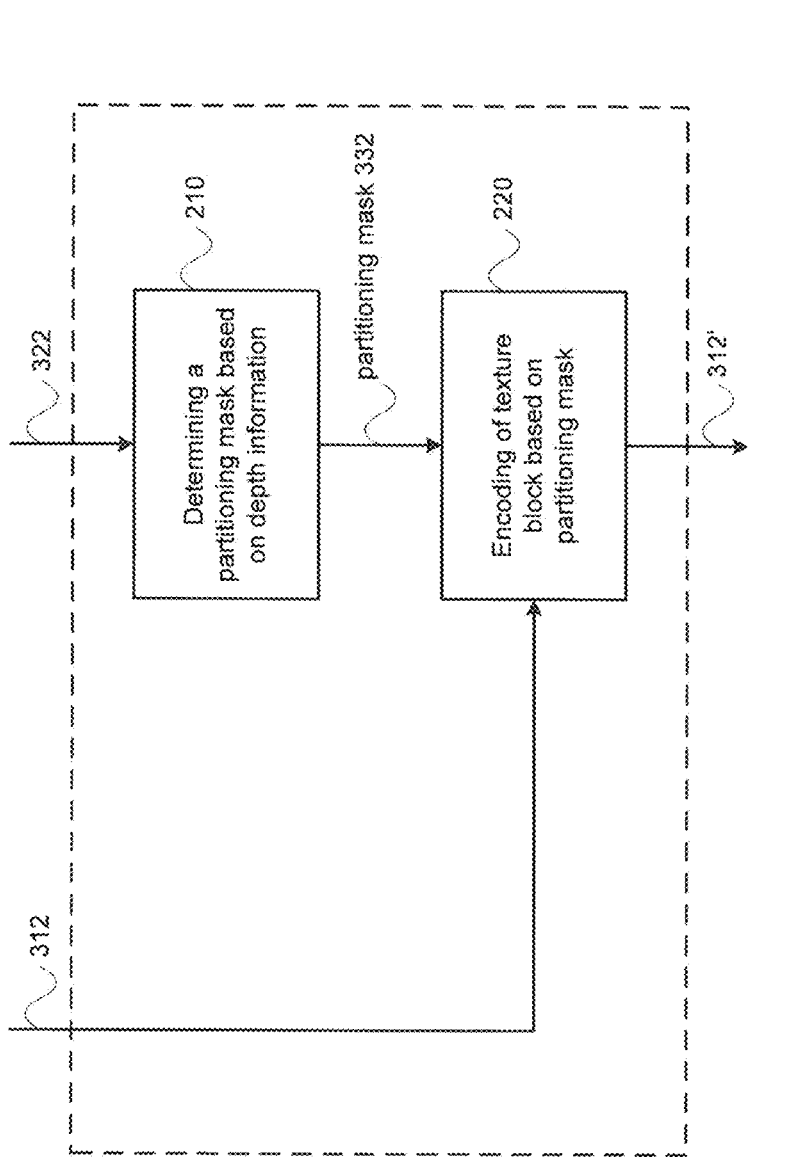
FIG. 2 shows a flow-chart of an embodiment of the method for encoding a texture block of a texture image using depth based block partitioning.
Figure 3:
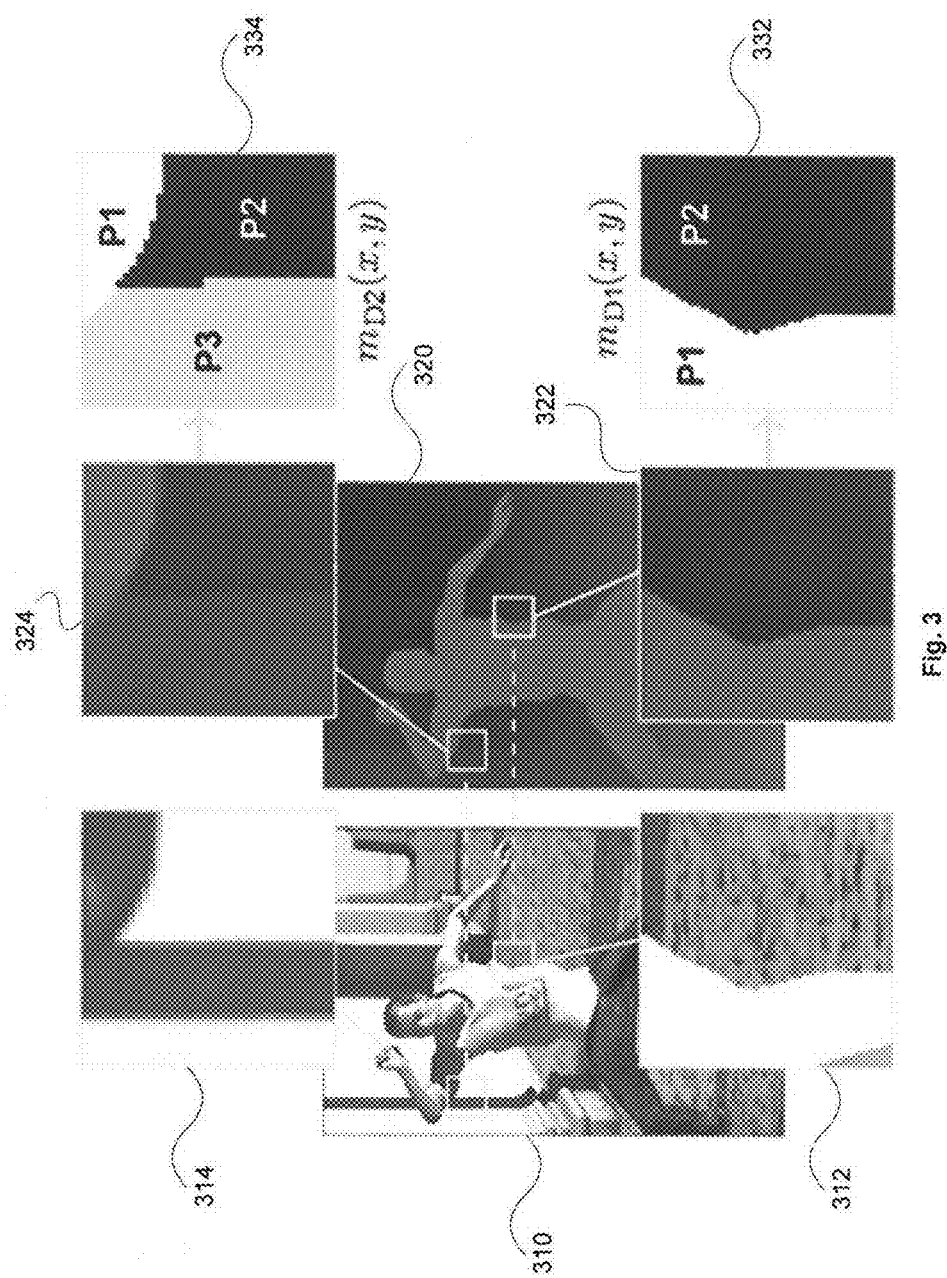
FIG. 3 shows an exemplary pair of a texture image and a corresponding depth map and two partitioning masks derived for two different texture blocks of the texture image based on depth based block partitioning.

In the following, embodiments of the method for encoding a texture block of a texture image using depth based block partitioning will be described based on FIGS. 2 and 3. FIG. 2 shows a flowchart of an embodiment of a method for encoding a texture block of a texture image using depth based block partitioning. FIG. 3 shows two exemplary depth-based block partitionings for a texture block.

FIG. 3 shows a texture image 310 comprising a first texture block 312 and a second texture block 314. FIG. 3 shows further the depth information associated to the texture image 310 in form of a depth map 320, which again comprises a depth information block 322 in form of a depth block 322, which comprises depth information in form of depth values associated to the first texture block 312, and a second depth information block 324 also in form of a depth block 324 comprising depth information in form of depth values associated to the second texture block 314. The first depth information block 322 comprises basically only two different predominant grey values, i.e., depth values, whereas the second depth information block 324 comprises basically three predominant grey values, i.e. depth values.

FIG. 3 shows two exemplary partitioning masks 332 and 334 determined based on the depth information contained in the respective depth blocks 322 and 324. The first partitioning mask 332 also referenced as $m_{DI}$ (x,y) in FIG. 3 comprises two partitions, a first partition P1 and a second partition P2 which shape and area correspond to the areas of the two predominant grey values of the first depth map block 322. The second partitioning mask 334 comprises three partitions, a first partition P1, a second partition, P2 and a third partition P3, which area and shape correspond to the areas of the three predominant grey values in the second depth map block 324.

The method 200 of depth based block partitioning encoding as shown in FIG. 2 comprises the following.

Determining 210 a partitioning mask 332 for the texture block based on depth information 322 associated to the texture block 312, wherein the partitioning mask 332 is adapted to define a plurality of partitions P1, P2 of the texture block and to associate a texture block element of the texture block 312 to a partition of the plurality of partitions.

Encoding 220 the texture block by encoding the partitions P1, P2 of the plurality of partitions of the texture block based on the partitioning mask 332.

In other words, the partitions P1 and P2 determined based on the first depth block 322 are mapped onto the texture block 312 and thus, associate the texture block elements to one of the two partitions P1 or P2.

For the sake of readability, in the following, embodiments of the present disclosure will be described with reference to the first texture block 312 and the corresponding depth information block 322 and the partitioning mask 332 derived based on the depth block 322 unless otherwise stated. It should be mentioned that this shall not limit embodiments of the disclosure, which can be also used to partition a texture block into three or more partitions as shown in FIG. 3 based on the second texture block 314, the corresponding second depth block 324 and the partitioning mask 334 derived from the depth information block 324.

The encoding of the partitions of the texture block, which may also be referred to as texture block partitions, may be performed using conventional encoding methods and encoding methods designed especially for the aforementioned depth based block partitioning.

According to an embodiment, the encoding 220 of the partitions of the plurality of partitions of the texture block further comprises the following: determining for a first partition P1 of the plurality of partitions of the texture block 312 separately from a second partition P2 of the plurality of partitions of the texture block 312 the coding information to be used for encoding the first partition P1, the coding information comprising, for example, one or more of the following: a prediction mode, a predictor index, a prediction direction, a reference picture index, a reference view index, transform coefficient, a motion vector and a coding context.

For embodiments of the method as shown in FIG. 2, the number of partitions forming the plurality of partitions may be predetermined or adaptively determined.

According to the disclosure, the block is partitioned into a plurality of partitions (at least two), e.g. into a number of N, N>1, partitions P={P1, . . . , PN} by thresholding the depth information values, e.g. depth or disparity values, associated with the points of the coded texture block using the threshold values T={$T_1$, . . . , $T_{N-1}$}. The points of the texture block may also be referred to as or texture elements. For each point of the coded texture block p(x,y), the following comparison between its associated depth or disparity value d(x,y) and the thresholds T is done:

If: $d(x,y) \geq T_{N-1} \Rightarrow p(x,y) \rightarrow PN$,

Else if: $d(x,y) < T_i \Rightarrow p(x,y) \rightarrow Pi$, i=[1,N−1].

The number of thresholds and their values can be predefined or adaptively selected. For determining the number of thresholds, embodiments may include, for example, predefining the number of partitions, or counting a number of peaks detected in a histogram of depth or disparity values calculated for the area associated with the coded texture block.

For determining the values of thresholds, embodiments may include, for example, using predefined values; calculating an average value of the depth or disparity values from the area associated with the coded texture block, and setting the threshold to the calculated average value, calculating a weighted average value of the depth or disparity values from the area associated with the coded texture block, e.g. weights may depend on a distance of the point from center of the texture block, and setting the threshold to the calculated weighted average value, or calculating a median value of the depth or disparity values from the area associated with the coded texture block, and setting the threshold to the calculated median value.

An exemplary result of such DBBP for two partitions and using a simple average value to determine a threshold value $T_1$ is presented in FIG. 3. The resulting partitioning is presented in form of a binary mask $m_{D1}(x,y)$ that determines which point of the coded texture block p(x,y) belongs to which partition (P1 or P2).

A second solution for determining the partitioning based on depth information associated with the coded texture block proposed by the disclosure is the application of an edge detection algorithm on an image representing the depth information in form of a depth or disparity map. In this embodiment, each detected edge determines the border between partitions.

Another embodiment for determining the partitioning is using a segmentation algorithm on an image representing the depth information in form depth or disparity map. The segmentation is performed by analyzing the intensity values, which represent the depth or disparity values, and merging image points with similar or equal value as a single segment. Each partition determined by assigning it all the points belonging to the same segment. Additionally, object-oriented segmentation can be performed which uses more advanced segmentation methods that take into consideration some prior knowledge about shape of the objects and/or perform object detection in the analyzed image.

In a further embodiment, the partitioning can be performed on a picture-level, i.e. the partitions are calculated for the whole picture and partitioning of the coded block is done by just assigning the picture-level partitions from the area corresponding to the coded block. In this way, the picture-level partition is assigned for each point of the coded block and all the points assigned to the same picture-level partition form a block-level partition. This approach applies especially for the depth-based partitioning methods such as object-oriented depth or disparity segmentation, depth or disparity image segmentation or depth or disparity image edge detection.

In a further embodiment, the depth based blocked partitioning is performed in an iterative manner. In each iteration, a partition fulfilling predetermined selection criteria is selected and further divided into sub-partitions until a predetermined termination-criterion is fulfilled, or as long as a further-partitioning criterion is still fulfilled, wherein the texture block performs the initial partition used for the iterative partitioning.

Figure 4:
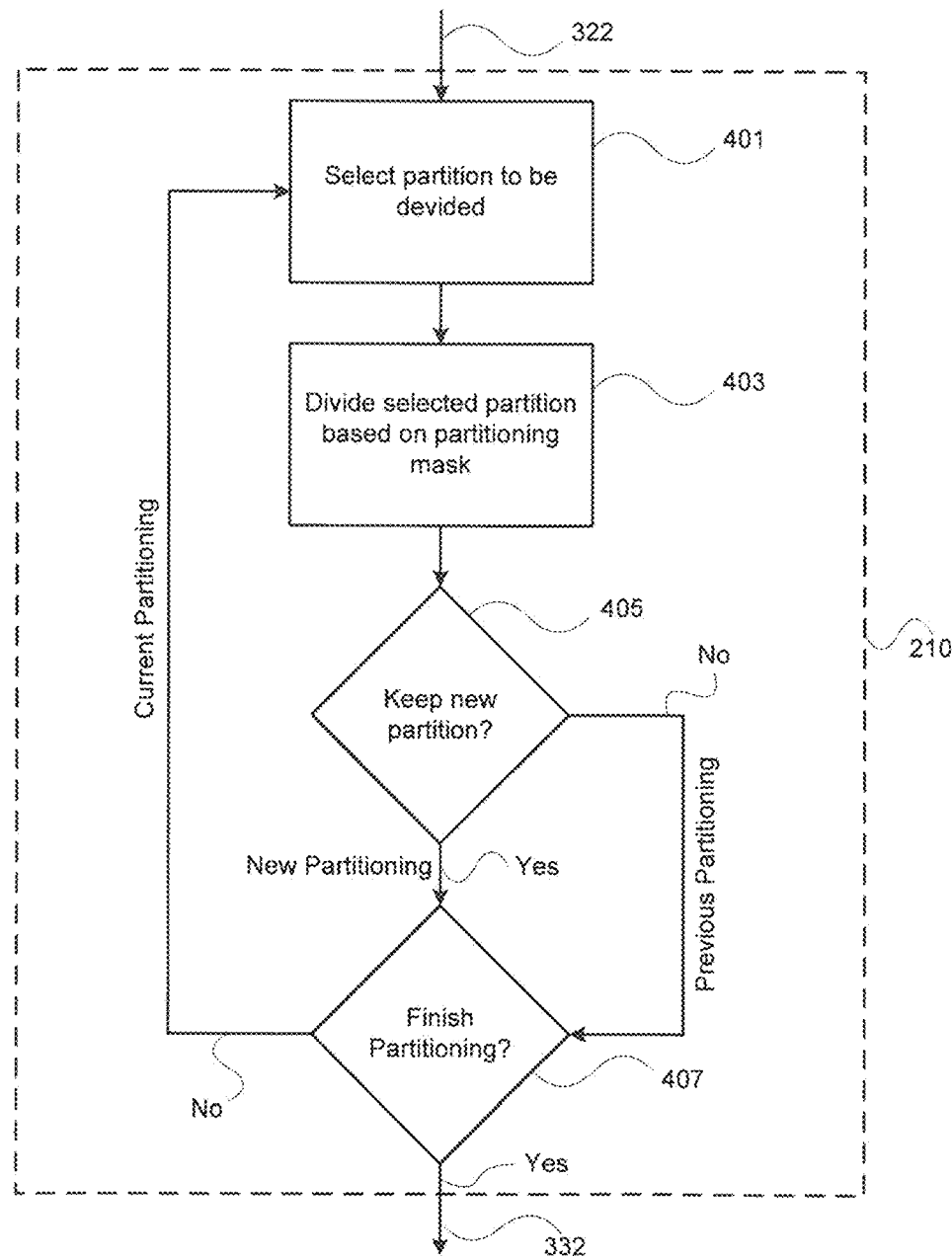
FIG. 4 shows a flow-chart of an embodiment of a method for encoding a texture block of a texture image using depth based block partitioning based on iteration.

FIG. 4 shows a flowchart of an embodiment of an iterative depth based block partitioning. The steps shown in FIG. 4 correspond to step 210 of FIG. 2. Embodiments according to FIG. 4 comprise the following.

Selecting 401 a partition to be divided into a predefined number of sub-partitions based on predefined criteria. For the first iteration the texture block as a whole is used as starting partition or initial partition. In the following iterations specified selection criteria are used to select the partition to be divided in step 401.

Dividing 403 the selected partition into the predefined number of sub-partitions using a predefined partitioning method based on depth information associated with the selected partition of the texture block. As partitioning method any of the above mentioned may be used. For example, the threshold based partitioning methods described above are very efficient for iterative partitioning.

Determining 405, whether the further partitioning of the selected partition into the sub-partitions shall be accepted or kept based on predefined criteria. If yes, the new partitioning becomes the current partitioning; otherwise, the previous partitioning is maintained.

Determining 407 whether the iterative partitioning shall be finished or, whether the iterative partitioning shall be continued based on predefined criteria.

Possible selection criteria for the selection a partition to be divided may include, for example, alone or in combination, the largest partition, the partition with largest depth or disparity difference between points within the partition, the difference can be measured, for example, as the difference between the largest and the smallest value, variance, standard deviation, or other statistical moments; the partition neighboring an already encoded/decoded neighboring block which contains more than one partition, with the border between these partitions lying on the border of the two blocks, or the partition with the average depth or disparity value of points within the partition that is the most different from the average values calculated for all or selected neighboring partitions.

Then, the dividing the selected partition into sub-partitions is performed as described previously (see non-iterative variants of DBBP).

Next, the selected partition is tested if the further partitioning should be accepted using a specified criteria. Possible embodiments of the decision function include testing if (a single or a combination of criteria may be used): the size of selected partition is large enough (predefined or adaptive threshold, e.g. dependent on input block size), the depth or disparity difference between points within each sub-partition is small/large enough (predefined or adaptive threshold), the number of sub-partitions is small or large enough (predefined or adaptive threshold).

Finally, in 407 the conditions for finishing the partitioning process are checked. Possible embodiments of the decision function include testing if (a single or a combination of criteria may be used): the number of partitions is equal or exceeds the defined number of partitions (predefined or adaptive threshold), the depth or disparity difference between points within each partition is small/large enough (predefined or adaptive threshold), or maximum number of iterations was exceeded (predefined or adaptive threshold).

The two above steps can be combined into one, in which testing both acceptance of new partitioning and conditions to finish the iterative partitioning are performed.

An example of such a partitioning is illustrated in FIG. 3. The resultant partitioning is presented in form of the partitioning mask $m_{D2}(x,y)$ 334 that determines which point of the coded texture block p(x,y) belongs to which partition (P1, P2 or P3). In this example, in a first iteration the texture block is divided into two partitions P1 and P2|P3 using a simple average value to determine the threshold. Because the differences in depth or disparity values in resultant sub-partitions are not small enough, the partitioning process is continued. In a second iteration the largest partition (P2|P3) is selected to be further divided. As a result of thresholding with a simple average value the partition is divided into two partitions P2 and P3. Now, the differences in depth/disparity values in resultant sub-partitions are small enough and, consequently, the partitioning process is finished.

Further embodiments of the method comprise adding an coding mode indicator to a bit-stream comprising coding information of the encoded partitions of the plurality of partitions of the texture block, wherein the coding mode indicator indicates whether the partitioning of the texture block was performed using a partitioning mask derived based on depth information associated to the texture block, and/or wherein the coding mode indicator indicates whether a specific partitioning mode of a plurality of different partitioning modes using a partitioning mask derived based on depth information associated to the texture block was used.

In other embodiments, the method further comprises encoding and decoding depth information associated to the texture block to obtain the depth information used for determining the partitioning mask.

In embodiments of the disclosure, the depth information associated to the texture block may be depth information comprised in a depth information block associated to the texture block. In embodiments of the disclosure, the depth information block may be a depth block comprising depth values as depth information or a disparity block comprising disparity values as depth information. In embodiments of the disclosure, the depth information associated to the texture block is associated to the same area of the image or picture, the same view and/or the same time instant as the texture block. In embodiments of the disclosure, the depth information may be depth values of a depth map or disparity values of a disparity map. In embodiments of the disclosure, the texture block element or point may be a picture element or any other spatially larger or smaller element defining a spatial resolution of the texture block.

Further embodiments of the disclosure can be adapted to use only the depth information associated to the texture block and/or no texture information associated to the texture block for determining the partitioning mask and/or for partitioning the texture block.

Figure 5:
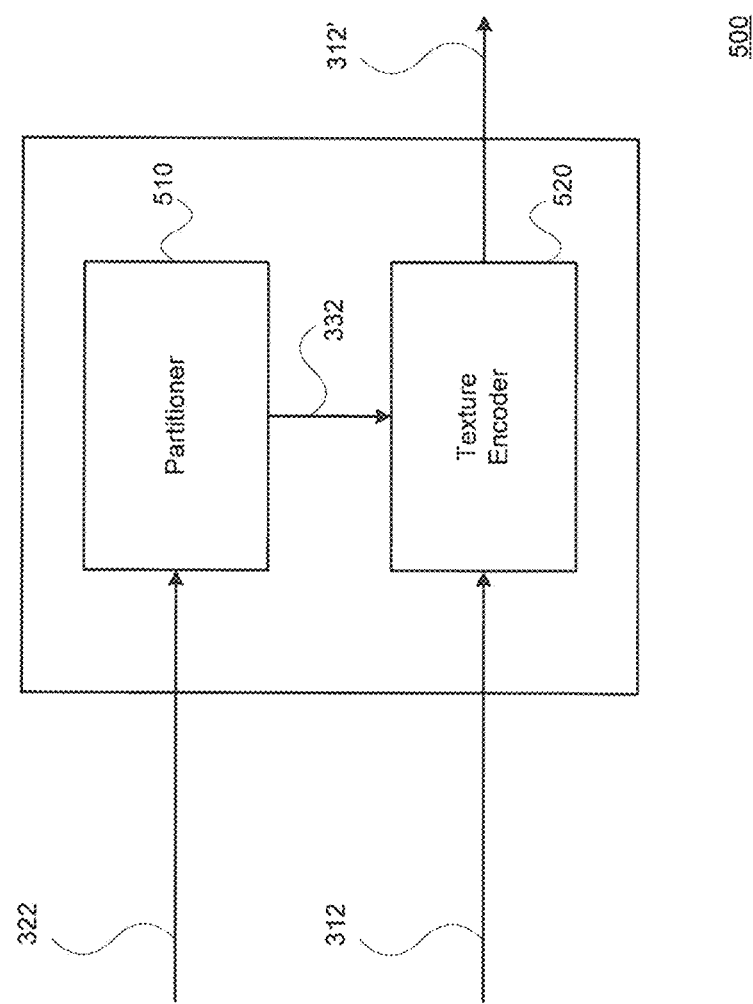
FIG. 5 shows a block diagram of an embodiment of an encoding apparatus for encoding a texture block of a texture image using depth based block partitioning.

FIG. 5 shows a block diagram of an embodiment of an encoding apparatus 500 comprising a partitioner 510 and a texture encoder 520.

The partitioner 510 is adapted to determine a partitioning mask 332 for the texture block 312 based on depth information 322 associated to the texture block, wherein the partitioning mask 332 is adapted to define a plurality of partitions P1, P2 and to associate a texture block element of the texture block to a partition of the plurality of partitions of the texture block.

The encoder 520 is adapted to encode the partitions of the plurality of partitions of the texture block based on the partitioning mask to obtain an encoded texture block 312'.

Figure 8:
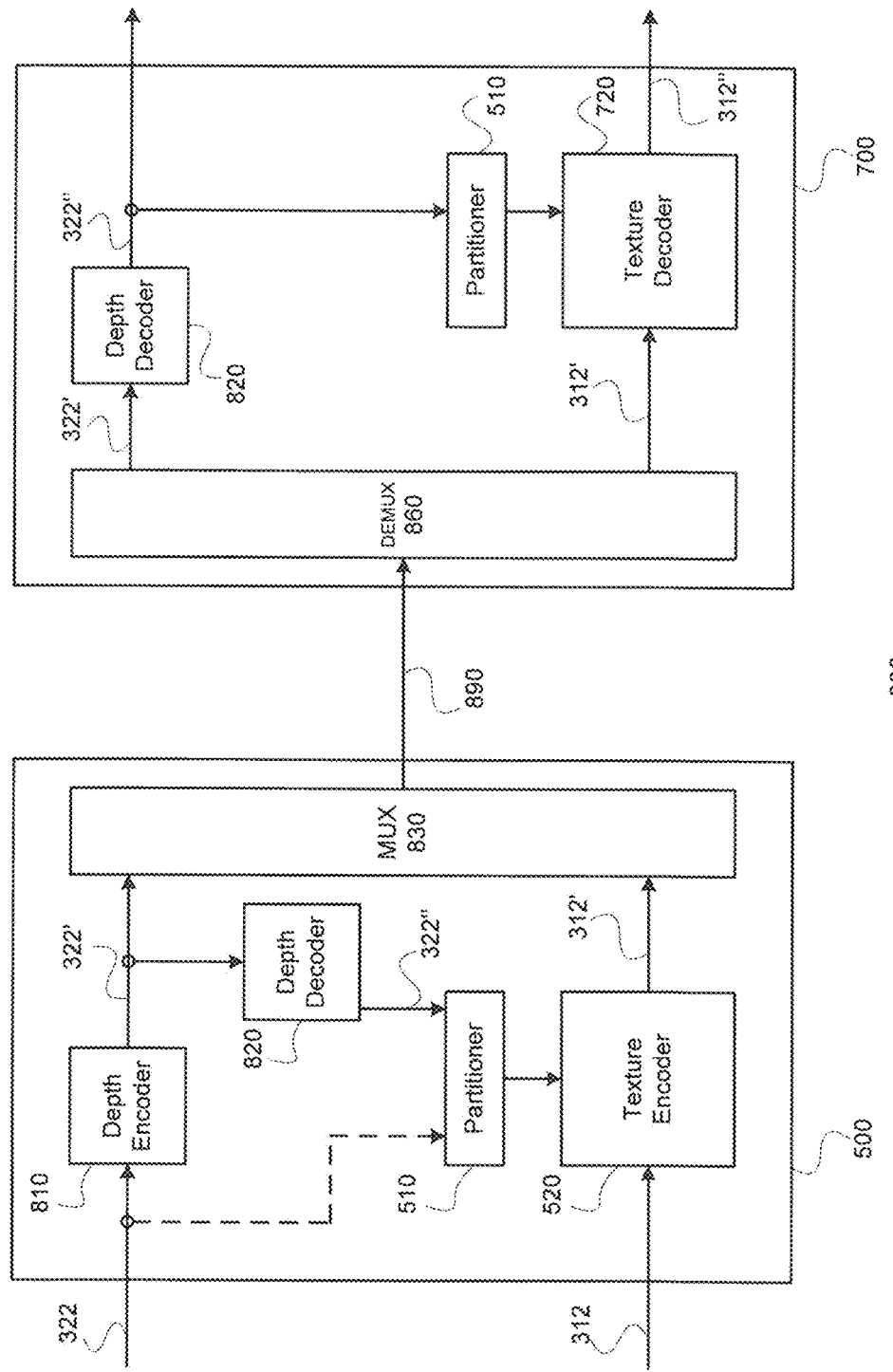
FIG. 8 shows a system for coding a texture block of a texture image using depth based block partitioning comprising the corresponding encoding apparatus and decoding apparatus.
Figure 10:
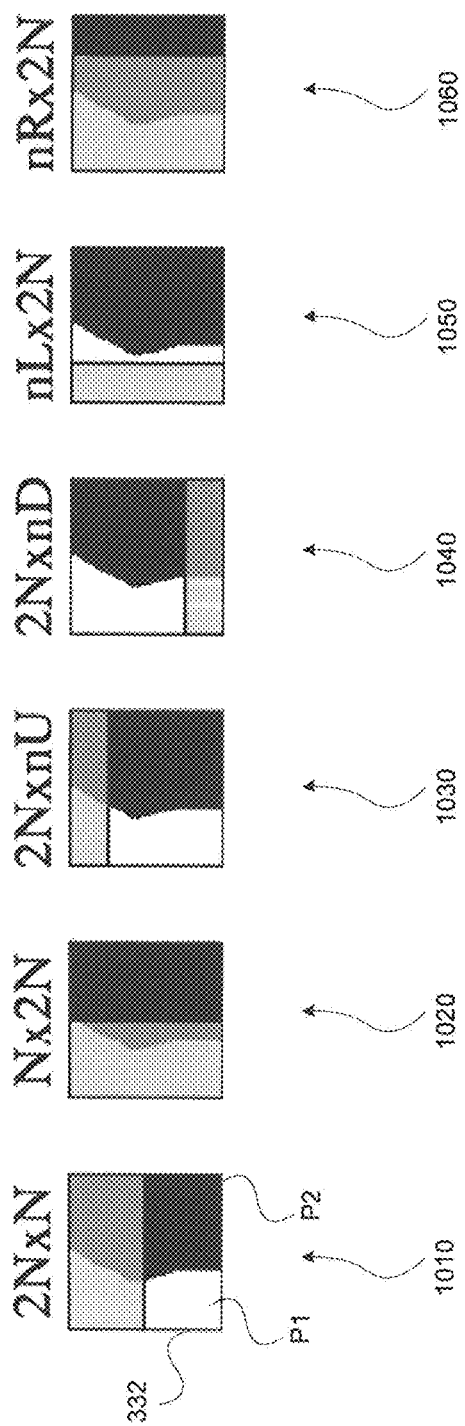
FIG. 10 shows overlaps of exemplary conventional regular partitioning modes with a depth-based block partitioning mode.
Figure 11:
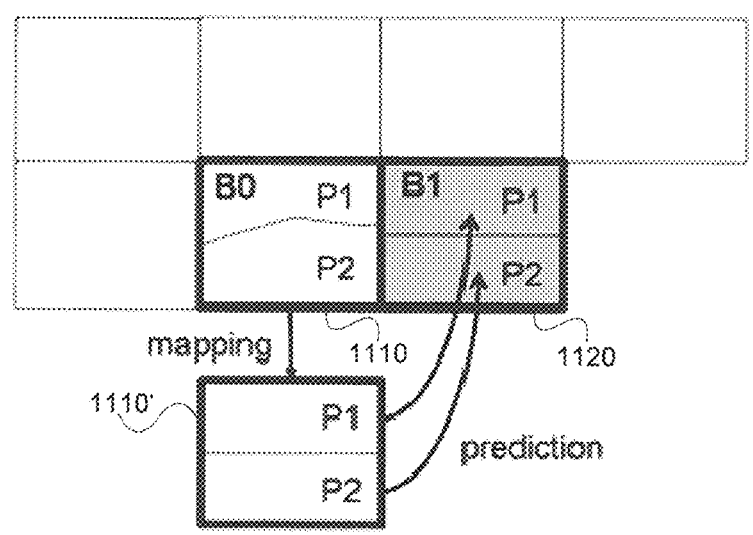
FIG. 11 shows a block diagram of an embodiment using mapping of the depth based block partitioned block into regular partitions for prediction.

Embodiments of the partitioner 510 may be adapted to perform any of the method steps related to the determination of the partitioning mask based on the depth information and the dividing of the texture block into the plurality of partitions, as described herein, e.g. based on FIGS. 2 and 4 with regard to the corresponding method step of determining 210 the partitioning mask for the texture block or with regard to FIGS. 8, 10 and 11.

The encoder 520 is adapted to perform any of the embodiments of the step of encoding 220 the texture block as described herein, e.g. based on FIGS. 1 to 4 or with regard to FIGS. 8, 10 and 11.

Figure 6:
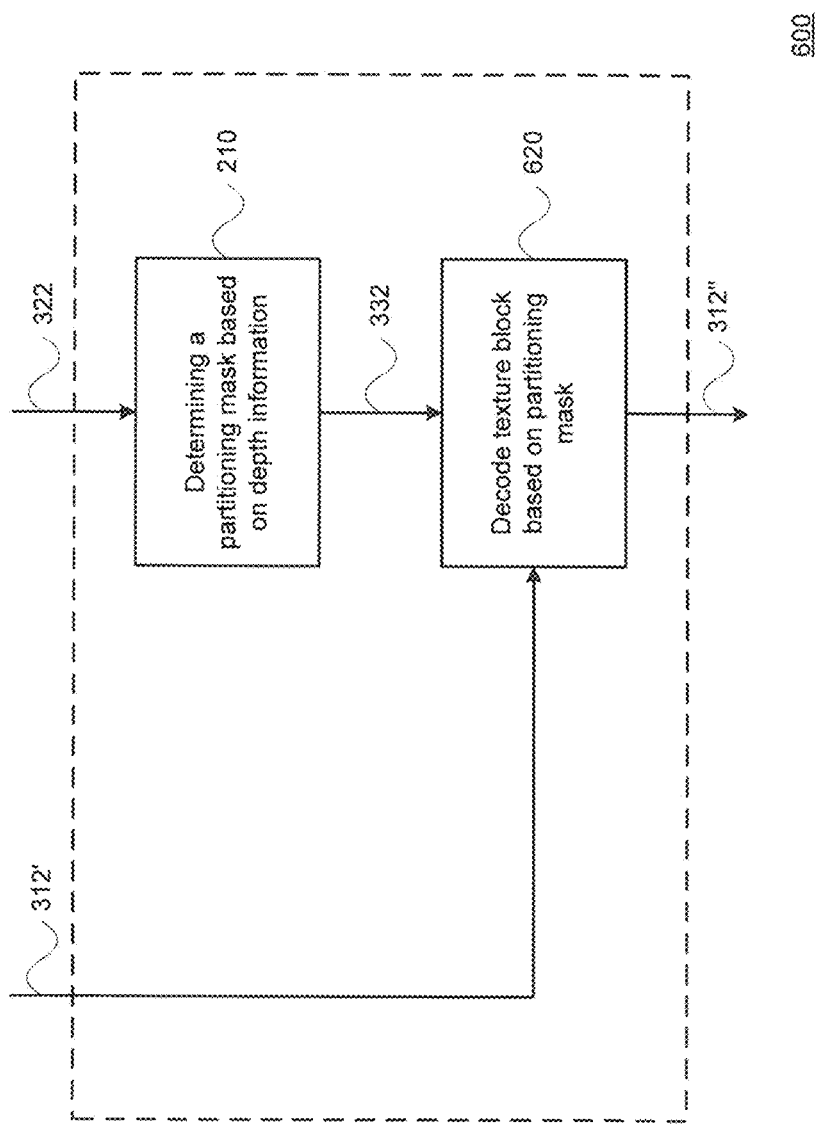
FIG. 6 shows a flow chart of an embodiment of a method for decoding an encoded texture block of a texture image using depth based block partitioning.

FIG. 6 shows a block diagram of an embodiment of a decoding method 600 for decoding an encoded texture block of a texture image using depth based block partitioning, the method of depth based block partitioning decoding comprising the following.

Determining 210 a partitioning mask 332 for the encoded texture block 312' based on depth information 322 associated to the encoded texture block 312', wherein the partitioning mask 332 is adapted to associate a texture block element of the encoded texture block 312' to a partition of a plurality of partitions P1, P2 of the encoded texture block. Decoding 620 based on the partitioning mask 332 the partitions of the plurality of partitions of the encoded texture block 312' to obtain a decoded texture block 312".

For the decoding step 620 conventional decoding methods and decoding methods especially designed for depth based block partitioning may be used to decode the encoded block.

Figure 7:
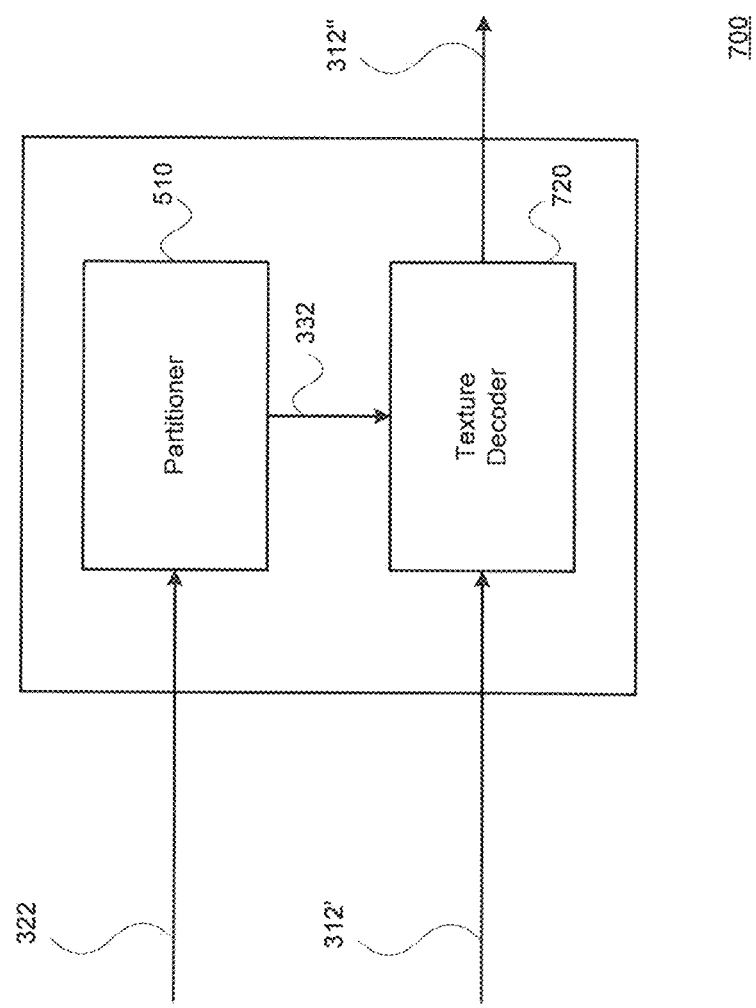
FIG. 7 shows a block diagram of a decoding apparatus for decoding an encoded texture block of a texture image using depth based block partitioning.

FIG. 7 shows a block diagram of an embodiment of an decoding apparatus for decoding an encoded texture block of a texture image using depth based block partitioning, the decoding apparatus 700 comprising a partitioner 510 and a texture decoder 720.

The partitioner 510 is adapted to determine a partitioning mask 332 for the encoded texture block 312' based on depth information associated to the encoded texture block 312', wherein the partitioning mask 332 is adapted to associate a texture block element of the encoded texture block to a partition of a plurality of partitions P1, P2 of the encoded texture block.

The decoder 720 which may also be referred to as texture decoder 720, is adapted to decode, based on the partitioning mask 332, the partitions of the plurality of partitions of the encoded texture block 312' to obtain the decoded texture block 312".

The partitioner 510 is adapted to perform any of the steps or functionalities related to the partitioning 210 as described herein, e.g. based on FIGS. 2, 4, 8, 10 and 11. In particular, embodiments of the partitioner 510 of the decoding apparatus 700 may have the same functionality as the partitioner 510 of the encoding apparatus 500 described based on FIG. 5.

The decoder 720 is adapted to perform any of the steps or functionalities related to the decoding step 220 as described herein, e.g. based on FIG. 6, 8 10 or 11. As the decoder is the counter-part of the encoder 520, the decoder 720 is adapted to perform the inverse coding to the encoding performed by the encoder 520 to reconstruct the texture block from the encoded texture block.

FIG. 8 shows a block diagram of a system 800 comprising an encoding apparatus 500 and a decoding apparatus 700.

Compared to the encoding apparatus 500 shown in FIG. 5, the embodiment of the encoding apparatus in FIG. 8 comprises additionally a depth encoder 810, a depth decoder 820 and a multiplexer (MUX) 830. Compared to the decoding apparatus 700 as shown in FIG. 7, the embodiment of the decoding apparatus 700 in FIG. 8 comprises additionally a demultiplexer (DEMUX) 860 and a depth decoder 820.

Referring to the encoding apparatus 500, the depth encoder 810 is adapted to receive the depth information, e.g. in form of a depth map 320 and/or the corresponding depth information blocks 322, and to encode the depth information to obtain the encoded depth information, e.g. an encoded depth map 320' and/or the corresponding encoded depth information blocks 322', to the multiplexer 830 and the depth decoder 820. The depth decoder 820 is adapted to perform on the encoded depth information the decoding corresponding to the encoding performed by the depth encoder 810 to obtain a decoded depth information, e.g. a decoded depth map 320" and/or a decoded depth information block 322". The partitioner 510 is adapted to receive the decoded depth information, e.g. decoded depth map 322" and/or the decoded depth information block 322", and to determine the partitioning mask 332 based on the decoded depth information associated to the texture block 312 to be encoded.

Alternatively, the partitioner 510 may be adapted to receive the original depth information (see broken line arrow in FIG. 8) associated to the texture block, e.g. the original depth map 320 and/or the original corresponding depth information block 322, or any other processed version of the depth information associated to the texture block, and to use the original depth information associated to the texture block to be encoded instead of the decoded depth information.

Using the decoded depth information 322", which corresponds to the depth information 322" available at the decoder side for the partitioning, models the situation at the decoding apparatus 700 more accurately, and thus, allows, for example, to calculate the residuum which corresponds to the residuum at the decoder side and to improve the coding efficiency.

The multiplexer 830 is adapted to receive the encoded depth information and the encoded texture information, e.g. the encoded texture block 312', and to multiplex these and potentially further information onto a bitstream 890, which is transmitted to the decoding apparatus 700. Alternatively, the bitstream may be stored on a storage medium.

Referring to the decoding apparatus 700, the demultiplexer 860 is adapted to extract the depth information 322', e.g. the encoded depth map and/or the encoded depth information blocks 322', and the encoded texture block 312' from the bitstream 890 and to pass the encoded depth information 322' to the depth decoder 820. The depth decoder 820 is adapted to decode the encoded depth information 322' to obtain a decoded depth information 322", e.g. the decoded depth map and/or decoded depth block, which it may output for further processing, and which it also forwards to the partitioner 510 for determining the partitioning mask 332. The texture decoder 720 receives the encoded texture block and decodes, based on the partitioning mask 332 received from the partitioner 510 the encoded texture block to obtain a decoded texture block 312".

Embodiments of the disclosure may be used in various ways for texture coding using the DBBP for 3D and texture-plus-depth video coding.

Embodiments can be adapted to use arbitrary shape partitions determined using DBBP to represent coding information of the coded texture block. Each partition may have its own set or subset of coding information, e.g. motion vectors, disparity vectors, reference picture indices, prediction mode, intra predictor, residuum.

Embodiments can be adapted to use DBBP partitions as a replacement for or in addition to conventional partitioning modes of the codec, i.e. DBBP partitions are the only available partitions used by the codec or enrich the originally available set of partitioning modes of the codec with the additional partitioning mode.

Embodiments can be adapted to use DBBP switchable per sequence, per GOP, per intra-period, per picture, per slice and per coding unit, and usage of DBBP partitions can be enabled or disabled for the specified range.

Embodiments can be adapted to use DBBP in interleaved video coding, wherein DBBP is independently applied to each field of the interleaved video.

Embodiments can be adapted to efficiently signal by way of adapting existing coding mode indicators a DBBP partitioning in HEVC-based codecs. The selection of usage of DBBP partitions to represent the coded texture block is, for example, signaled in dependent texture views as partitioning into two vertical halves (N×2N=N in width×2N in height) and an additional 1-bit dbbp_flag which is required to distinguish the usage of DBBP from original N×2N partitioning.

FIG. 9 shows a pseudo code of an embodiment of the disclosure with regard to the parsing of the coding mode indicator to determine which coding mode is signaled and to be used for the decoding of the encoded texture block. In line 910 the partitioning mode is read. In line 920 the value of the flag dbbp_flag for distinguishing between conventional, e.g. regular shaped, partitioning and the DBBP partitioning is set to a default value "false". In line 930 the value of the dbbp_flag is read if, and only if, the conventional partitioning mode indicates the use of the N×2N partitioning. In line 940 the DBBP partitioning 210 is performed in case the dbbp_flag is "true". Otherwise, the conventional N×2N partitioning is performed. In this way, the number of DBBP flags that need to be transmitted for the blocks that do not use DBBP can be reduced significantly, which again increases the coding performance.

Embodiments can be adapted to use DBBP partitions P1, P2 for intra-prediction, wherein the intra-prediction mode is determined for each DBBP partition. The predicted intra-prediction mode is determined for each DBBP partition. The coding costs that are used are calculated for DBBP partition. The coding 520, 720 of each element is done per partition.

Embodiments can be adapted to use DBBP partitions P1, P2 for motion and/or disparity-compensated prediction, wherein motion and/or disparity-vectors, reference picture indices and number of reference pictures are determined for each DBBP partition. Predicted motion and/or disparity vectors, reference picture indices and number of reference pictures are determined for each DBBP partition. The coding costs that are used are calculated for DBBP partition. Coding 520 of each element is done per partition.

Using DBBP partitions for residuum prediction—residuum is determined for each DBBP partition. Predicted residuum is determined for each DBBP partition. The coding costs that are used are calculated for DBBP partition. Coding 520, 720 of each element is done per partition.

Embodiments can be adapted to map arbitrary shape of DBBP partitions onto available regular, e.g. rectangular, partitions for storing of the coding information for the coded block (including partitioning) to be easily referenced (used for prediction) by latter encoded/decoded blocks.

In a first exemplary embodiment using such a mapping, the mapping is performed by down-sampling an original, e.g. pixel-wise, partitioning mask onto 2×2, 4×4, 8×8, 16×16, 32×32, 64×64, etc. pixel grids. The lowest cost partitioning using regular partitions giving the same course-partitioning is selected as a representative for the DBBP partitioning.

In a second exemplary embodiment using such mapping, which can be used in case of two partitions, the mapping is performed by calculating a correlation with all available regular partitioning modes for the current level in a block-tree, e.g. a quad-tree of HEVC-based codecs, and selecting the most similar one as a representative for the DBBP partitioning. For example, the mapping of the DBBP partitions to one of the 6 available two-segment partitioning modes of HEVC as shown in FIG. 10 is performed by a correlation analysis.

FIG. 10 shows exemplary superpositions of conventional regular shaped partitioning modes (in grey and transparent) and the exemplary depth-based block partitioning mask 332 (P1 and P2 in white and black). Superposition 1010 is a superposition of partitioning mask 332 with a 2N×N partitioning. Superposition 1020 is a superposition of partitioning mask 332 with a N×2N partitioning. Superposition 1030 is a superposition of partitioning mask 332 with a 2N×nU partitioning. Superposition 1040 is a superposition of partitioning mask 332 with a 2N×nD partitioning. Superposition 1050 is a superposition of partitioning mask 332 with a nL×2N partitioning. The best matching regular shaped partitioning mode $i_{opt}$ is selected for storing the coding information, e.g. motion vectors, ref picture indices, coding mode, residuum, disparity vector, etc.

The best match can be determined, for example, as follows. For each of the available partitioning modes $i^\varepsilon[0,5]$ (FIG. 11) two binary masks $m_{2i}$ (x, y) and $m_{2i+1}$ (x, y) are generated (refer to the example illustrated in FIG. 3), where $m_{2i+1}$ (x, y) is the negation of $m_{2i}$ (x, y). To find the best matching partitioning mode $i_{opt}$ for the current depth-based segmentation mask $m_D$ (x, y), the following algorithm is performed:

$$k_{opt} = \underset{k}{\operatorname{argmax}} \sum_{x}^{2N-1} \sum_{y}^{2N-1} m_D(x, y) * m_k(x, y), k^\varepsilon[0, 11]$$

$$i_{opt} = \left[\frac{k_{opt}}{2}\right]$$

In this way, all the blocks that are coded, i.e. encoded or decoded, after the block with DBBP partitions can easily interpret and utilize the mapped block partitioning scheme of the DBBP block for prediction and/or context derivation using conventional regular shaped partitioning based approaches. However, the DBBP block is still coded with the DBBP partitioning, which means that the mapping procedure does not influence the encoding or decoding process of the DBBP block.

Embodiments of DBBP partitioning combined with such kind of mapping have the following advantages.

Usage of a smaller number of contexts (in particular Context-adaptive binary arithmetic coding (CABAC) context models). Adding new context models is not required or at least the number of added models can be limited to a very small number.

There is an easier incorporation into existing codecs. Traditional coding modes can easily treat the DBBP block like one of the traditionally coded blocks; no further modifications of the existing methods of prediction from the reference neighboring blocks or development of specific prediction methods from DBBP reference block need to be done.

FIG. 11 shows an exemplary prediction from a DBBP reference block B0 1110 using mapping of the DBBP partitioning mask into a regular partition. The DBBP coded block B0 is mapped as a regular 2N×N partitioned block 1110'. Consequently, for all the blocks that are encoded or decoded after this DBBP block B0 can be used as a reference utilizing the traditional prediction methods. Information representing the coded block, e.g. motion vectors and reference picture indices assigned to DBBP partitions of the block B0 can be further used as a prediction reference for traditional coding of the motion information of a consecutive block, for example consecutive block B1 1120.

Embodiments can be adapted to calculate the cost used for selecting a coding mode for the block and/or partitions. The cost functions can are modified in a way that for each partition only pixels belonging to this partition are taken into account to compute the cost.

Embodiments can be adapted to calculate a single depth or disparity value representing each partition. The representative value is computed as the average, weighted average, median, minimum, maximum of the depth or disparity values associated with coded texture block (e.g. weights depend on distance from center of the block/partition). The resultant value can be used for disparity-compensated prediction, to predict depth or disparity values for the partitions and/or blocks or as a reference depth or disparity values for coding other blocks and/or partitions.

Embodiments can be adapted to determine foreground and background partitions using depth or disparity values representing each DBBP partition. The depth or disparity value representing each DBBP partition is used to determine which partition is closer or more distant from the camera.

Embodiments can be adapted to determine disocclusion areas based on foreground and background picture areas computed based on depth or disparity values representing each DBBP partition. The foreground and background partitions determined based on the depth or disparity value representing each DBBP partition is used to determine disocclusion areas in the picture.

Embodiments can be adapted to improve the coding efficiency using depth or disparity values computed based on DBBP for disparity-compensated prediction. The depth or disparity value representing each DBBP partition is used as the prediction of disparity vector used for disparity-compensated prediction.

Embodiments can be adapted to improve the coding efficiency using depth or disparity values computed based on DBBP for adaptive quantization parameter (QP) or quantization parameter for depth (QD) selection based on a distance from the camera. The depth or disparity value representing each DBBP partition is used for selecting the QP or QD quantization parameter for each partition based on the distance from the camera (the larger the distance from the camera, the higher QP or QD value is selected).

Embodiments of the disclosure also provide solutions for minimizing the complexity of video coding when DBBP is utilized, as will be explained in the following.

Embodiments can be adapted to calculate and store intra-predicted, motion or disparity-compensated and residuum prediction signals for each partition in a regular (rectangular) shape blocks. For calculating and storing the abovementioned prediction signals in the memory, regular (rectangular) shape blocks are used for each partition, however, only pixels belonging to the respective partition are valid in each block. This saves the number of individual calls to memory and allows pixel-wise calls to avoid memory because the whole regular block of memory is copied, read and/or stored). As a result, a regular memory access is provided.

Embodiments can be adapted to compute the DBBP partitioning based on sparse depth information—partitioning is computed using a sparse representation of depth information, i.e. non-pixel-wise (e.g. down-sampled depth or disparity map). In this way, the number of depth or disparity points to be analyzed and processed decreases, however, accuracy of the partitioning is slightly lower.

Embodiments can be adapted to compute the DBBP partitioning based on dense, e.g. pixel-wise, depth information and down-sampling the resolution of partitioning mask to a 2×2, 4×4, 8×8, 16×16, etc. grid. In this way, the resolution of data structures that store all the coding information describing the coded partitions can be decreased, saving the amount of memory and number of memory read/write operations.

Embodiments can be adapted to decrease the complexity of the video coding with DBBP applied by turning off the loop filters. The complexity of the video coding process can be decreased by turning off the loop filters, e.g. deblocking, adaptive loop filter (ALF) or sample adaptive offset (SAO)) for the blocks that contain DBBP partitions. As a result, complexity of video coding is lower with only a small decrease in coding performance, i.e. rate-distortion ratio.

Embodiments of the disclosure provide a method, which can be referred to as DBBP. In embodiments the partitioning of the texture block may be performed using only depth information and no texture information, e.g. only depth information related to the texture block but no texture information of the texture block. Alternative embodiments may combine the depth based block partitioning with other partitioning methods, e.g. based on coarse texture information to keep the complexity low. However, using only the depth information in form of a partitioning mask provides a simple, low complexity but nevertheless efficient way to partition a texture block.

This way depth information that is available in the decoder can be reused to improve compression without necessity to send any further information about the partitions' shape in the bitstream.

Summarizing the above, embodiments of the disclosure provide a coding solution for coding a texture block using at least two partitions of an arbitrary shape, which is determined based on depth information, e.g. in a form of depth or disparity map associated with the coded texture block. As the shape of the partitions can be well fitted to the object borders of the texture block, an additional flexibility for the coding process is obtained, which preserves the encoder from further partitioning the texture block into smaller regular, i.e. rectangular, shaped partitions, saving bits for signaling these partitions. According to embodiments of the disclosure, the arbitrary shape of the partitions can be determined at the decoder based on available depth information associated with the coded texture block. Consequently, the exact shape of the depth-based partitions does not need to be transmitted in the bitstream, reducing the bitrate.

What is claimed is:

1. An apparatus for decoding an encoded texture block of a texture image, wherein the apparatus comprises:
a partitioner configured to determine a partitioning mask for the encoded texture block based on depth information associated to the encoded texture block, wherein the partitioning mask is configured to:
define a plurality of partitions, wherein the encoded texture block comprises a rectangle, and wherein the partitions divide the rectangle into a plurality of irregular shapes; and
associate a texture block element of the encoded texture block to a partition of the plurality of partitions of the encoded texture block; and a decoder coupled to the partitioner and configured to decode the partitions of the plurality of partitions of the encoded texture block based on the partitioning mask,
wherein the partitioner is further configured to associate the texture block element of the encoded texture block to one of the plurality of partitions based on a comparison of a depth information value associated to the texture block element with a threshold value, and
wherein the partitioner is further configured to adaptively determine the threshold value by one of:
calculating an average value of the depth information values for an area associated with the texture block to be decoded and setting the threshold value to the calculated average value;
calculating a weighted average of the depth information values for the area associated with the texture block to be decoded, wherein weights used in calculating the weighted average depend on a distance from a center of the texture block, and setting the threshold value to the weighted average value; or
calculating a median value for the depth information values from the area associated with the texture block to be decoded and setting the threshold value to the calculated median value.

2. The apparatus of claim 1, wherein a number of partitions forming the plurality of partitions is predetermined or is adaptively determined by analyzing the depth information associated to the texture block.

3. The apparatus of claim 1, wherein the partitioner is further configured to determine the partitioning mask in an iterative manner, wherein in each iteration a partition fulfilling predetermined selection criteria is further divided into sub-partitions until a predetermined termination-criterion is fulfilled or as long as a further-partitioning-criterion is fulfilled, and wherein the texture block performs an initial partition used for the iterative partitioning.

4. The apparatus of claim 1, further comprising:
a demultiplexer coupled to the partitioner and configured to extract encoded depth information from a bitstream; and
a depth decoder coupled to the demultiplexer and configured to decode the encoded depth information to obtain the depth information associated to the encoded texture block.

5. The apparatus of claim 4, wherein the demultiplexer is further configured to extract from a bitstream coding information for a first partition of the plurality of partitions of the encoded texture block separately from coding information for a second partition of the plurality of partitions of the texture block, wherein the depth decoder is further configured to decode the first partition using the coding information, and wherein the coding information comprises one or more of a prediction mode, a predictor index, a prediction direction, a reference picture index, a reference view index, a transform coefficient, a motion vector, or a coding context.

6. The apparatus of claim 1, wherein the partitions comprise three or more partitions.

7. The apparatus of claim 1, wherein each of the partitions within the encoded texture block comprises a different shape.

8. The apparatus of claim 1, further comprising the encoded texture block and a plurality of other encoded texture blocks.

9. The apparatus of claim 8, wherein each of the encoded texture block and the other encoded texture blocks comprise a different number of partitions.

10. The apparatus of claim 8, wherein each of the encoded texture block and the other encoded texture blocks are determined iteratively.

11. The apparatus of claim 8, wherein each of the encoded texture block and the other encoded texture blocks are associated with a different threshold for determining a number of partitions.

12. The apparatus of claim 8, wherein each of the encoded texture block and the other encoded texture blocks are associated with a different number of thresholds.

13. The apparatus of claim 1, wherein the irregular shapes do not comprise rectangles.

14. The apparatus of claim 1, wherein the texture image comprises a matrix of chrominance and luminance values.

15. The apparatus of claim 1, wherein the texture image is a part of a three-dimensional visual scene.

16. A method for decoding an encoded texture block of a texture image, comprising:
 determining a partitioning mask for the encoded texture block based on depth information associated to the encoded texture block, wherein the partitioning mask is configured to:
  define a plurality of partitions, wherein the encoded texture block comprises a rectangle, and wherein the partitions divide the rectangle into a plurality of irregular shapes; and
  associate a texture block element of the encoded texture block to a partition of the plurality of partitions of the encoded texture block based on a comparison of a depth information value associated to the texture block element with a threshold value; and
 decoding the partitions of the plurality of partitions of the encoded texture block based on the partitioning mask, wherein determining the threshold value comprises one of:
  calculating an average value of the depth information values for an area associated with the texture block to be decoded and setting the threshold value to the calculated average value;
  calculating a weighted average of the depth information values for the area associated with the texture block to be decoded, wherein weights used in calculating the weighted average depend on a distance from a center of the texture block, and setting the threshold value to the weighted average value; or
  calculating a median value for the depth information values from the area associated with the texture block to be decoded and setting the threshold value to the calculated median value.

17. A non-transitory computer readable medium comprising:
 a program code configured to perform a method for decoding an encoded texture block of a texture image, wherein the method comprises:
  determining a partitioning mask for the encoded texture block based on depth information associated to the encoded texture block, wherein the partitioning mask is configured to:
   define a plurality of partitions, wherein the encoded texture block comprises a rectangle, and wherein the partitions divide the rectangle into a plurality of irregular shapes; and
   associate a texture block element of the encoded texture block to a partition of the plurality of partitions of the encoded texture block based on a comparison of a depth information value associated to the texture block element with a threshold value; and
  decoding the partitions of the plurality of partitions of the encoded texture block based on the partitioning mask when the computer program runs on a computer,
 wherein determining the threshold value comprises one of:
  calculating an average value of the depth information values for an area associated with the texture block to be decoded and setting the threshold value to the calculated average value;
  calculating a weighted average of the depth information values for the area associated with the texture block to be decoded, wherein weights used in calculating the weighted average depend on a distance from a center of the texture block, and setting the threshold value to the weighted average value; or
  calculating a median value for the depth information values from the area associated with the texture block to be decoded and setting the threshold value to the calculated median value.

18. An apparatus for encoding a texture block of a texture image, comprising:
 a partitioner configured to determine a partitioning mask for the texture block based on depth information associated to the texture block, wherein the partitioning mask is configured to:
  define a plurality of partitions of the texture block, wherein the texture block comprises a rectangle, and wherein the partitions divide the rectangle into a plurality of irregular shapes; and
  associate a texture block element of the texture block to a partition of the plurality of partitions; and
 an encoder coupled to the partitioner and configured to encode the texture block by encoding the partitions of the plurality of partitions of the texture block based on the partitioning mask,
 wherein the partitioner is further configured to associate the texture block element of the texture block to one of the plurality of partitions based on a comparison of a depth information value associated to the texture block element with a threshold value, and
 wherein the partitioner is further configured to adaptively determine the threshold value by one of:
  calculating an average value of the depth information values for an area associated with the texture block to be decoded and setting the threshold value to the calculated average value;
  calculating a weighted average of the depth information values for the area associated with the texture block to be decoded, wherein weights used in calculating the weighted average depend on a distance from a center of the texture block, and setting the threshold value to the weighted average value; or
  calculating a median value for the depth information values from the area associated with the texture block to be decoded and setting the threshold value to the calculated median value.

19. The encoder of claim 18, further configured to determine for a first partition of the plurality of partitions of the texture block separately from a second partition of the plurality of partitions of the texture block the coding information to be used for encoding the first partition, wherein the coding information comprises one or more of a prediction mode, a predictor index, a prediction direction, a reference picture index, a reference view index, a motion vector, a transform coefficient, or a coding context.

20. A method for encoding a texture block of a texture image, comprising:
   determining a partitioning mask for the texture block based on depth information associated to the texture block, wherein the partitioning mask is configured to:
      define a plurality of partitions of the texture block, wherein the texture block comprises a rectangle, and wherein the partitions divide the rectangle into a plurality of irregular shapes; and
      associate a texture block element of the texture block to a partition of the plurality of partitions based on a comparison of a depth information value associated to the texture block element with a threshold value; and
   encoding the texture block by encoding the partitions of the plurality of partitions of the texture block based on the partitioning mask, wherein determining the threshold value comprises one of:
   calculating an average value of the depth information values for an area associated with the texture block to be decoded and setting the threshold value to the calculated average value;
   calculating a weighted average of the depth information values for the area associated with the texture block to be decoded, wherein weights used in calculating the weighted average depend on a distance from a center of the texture block, and setting the threshold value to the weighted average value; or
   calculating a median value for the depth information values from the area associated with the texture block to be decoded and setting the threshold value to the calculated median value.

* * * * *